§§ US011425704B2

United States Patent
Muruganathan et al.

(10) Patent No.: US 11,425,704 B2
(45) Date of Patent: *Aug. 23, 2022

(54) SIGNALING IN RRC AND MAC FOR PDSCH RESOURCE MAPPING FOR PERIODIC AND SEMIPERSISTENT REFERENCE SIGNAL ASSUMPTIONS

(71) Applicant: Telefonaktiebolaget LM Ericsson (publ), Stockholm (SE)

(72) Inventors: Siva Muruganathan, Stittsville (CA); Sebastian Faxér, Järfälla (SE); Shiwei Gao, Nepean (CA); Helka-Liina Määttänen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,587

(22) Filed: Jan. 28, 2020

(65) Prior Publication Data

US 2020/0187175 A1    Jun. 11, 2020

Related U.S. Application Data

(63) Continuation of application No. 16/268,065, filed on Feb. 5, 2019, now Pat. No. 10,582,489, which is a (Continued)

(51) Int. Cl.
*H04W 72/04* (2009.01)
*H04W 76/27* (2018.01)
(Continued)

(52) U.S. Cl.
CPC ............ *H04W 72/042* (2013.01); *H04B 7/02* (2013.01); *H04L 5/005* (2013.01); *H04L 5/0035* (2013.01);
(Continued)

(58) Field of Classification Search
None
See application file for complete search history.

(56) References Cited

U.S. PATENT DOCUMENTS

| 10,582,489 B2 * | 3/2020 | Muruganathan ...... H04L 5/0096 |
| 2014/0177601 A1 | 6/2014 | Nishio et al. |

(Continued)

FOREIGN PATENT DOCUMENTS

| CN | 104429141 A | 3/2015 |
| EP | 2983422 A1 | 2/2016 |

(Continued)

OTHER PUBLICATIONS

LG Electronics, "R1-171974: Discussion on rate matching for PDSC/PUSCH," 3GPP TSG RAN WG1 Meeting 90bis, Oct. 9-13, Prague, Czech Republic, 11 pages.
(Continued)

*Primary Examiner* — Kouroush Mohebbi
(74) *Attorney, Agent, or Firm* — Withrow & Terranova, PLLC

(57) ABSTRACT

Systems and methods for activating a Semi-Persistent (SP) Zero Power (ZP) Channel State Information Reference Signal (CSI-RS) are provided. In some embodiments, a method performed by a wireless device includes for activating SP ZP CSI-RS includes receiving, from a network node, a control message that indicates the activation of one or more SP ZP CSI-RS resources; and activating, based on the control message, the one or more SP ZP CSI-RS resources. In this way, ZP CSI-RS may be used for rate matching around other wireless devices and a SP ZP CSI-RS resource may be activated without activating any Non-Zero Power (NZP) CSI-RS, CSI-Interference Measurement (CSI-IM), or CSI reporting for the wireless device.

19 Claims, 18 Drawing Sheets

Related U.S. Application Data continuation of application No. PCT/IB2019/050242, filed on Jan. 11, 2019.

(60) Provisional application No. 62/616,981, filed on Jan. 12, 2018.

(51) Int. Cl.
  *H04L 5/00* (2006.01)
  *H04B 7/02* (2018.01)
(52) U.S. Cl.
  CPC .......... *H04L 5/0048* (2013.01); *H04L 5/0096* (2013.01); *H04W 76/27* (2018.02); *H04L 5/0023* (2013.01)

(56) References Cited

U.S. PATENT DOCUMENTS

| | | | |
|---|---|---|---|
| 2018/0062724 A1 | 3/2018 | Onggosanusi et al. | |
| 2019/0116009 A1* | 4/2019 | Yum | H04L 5/0082 |
| 2019/0149065 A1 | 5/2019 | Tarkiainen et al. | |
| 2019/0174466 A1 | 6/2019 | Zhang et al. | |
| 2019/0215130 A1 | 7/2019 | Aiba et al. | |
| 2019/0223161 A1 | 7/2019 | Muruganathan et al. | |
| 2019/0312668 A1 | 10/2019 | Park et al. | |
| 2019/0373614 A1 | 12/2019 | Yum et al. | |
| 2019/0380114 A1 | 12/2019 | Yokomakura et al. | |
| 2020/0107392 A1 | 4/2020 | Yi et al. | |
| 2020/0229014 A1 | 7/2020 | Nagata et al. | |
| 2021/0084630 A1* | 3/2021 | Muruganathan | H04W 72/042 |

FOREIGN PATENT DOCUMENTS

| | | | |
|---|---|---|---|
| EP | 3410772 A2 | 12/2018 | |
| WO | 2018144920 A1 | 8/2018 | |
| WO | 2019138380 A1 | 7/2019 | |

OTHER PUBLICATIONS

Notice of Preliminary Rejection for Korean Patent Application No. 10-2020-7022514, dated Sep. 29, 2020, 8 pages.
Non-Final Office Action for U.S. Appl. No. 17/107,859, dated Jan. 28, 2021, 7 pages.
Office Action for Colombian Patent Application No. NC2020/0008269, dated Nov. 26, 2020, 23 pages.
Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.0.0, 3GPP Organizational Partners, Dec. 2017, 109 pages.
Author Unknown, "Technical Specification Group Radio Access Network; NR; Physical channels and modulation (Release 15)," Technical Specification 38.211, Version 15.0.0, 3GPP Organizational Partners, Dec. 2017, 73 pages.
Author Unknown, "Technical Specification Group Radio Access Network; NR; Physical layer procedures for data (Release 15)," Technical Specification 38.214, Version 15.0.0, 3GPP Organizational Partners, Dec. 2017, 71 pages.
Author Unknown, "Technical Specification Group Radio Access Network; NR; Medium Access Conlrol (MAC) protocol specification (Release 15)," Technical Specification 38.321, Version 15.0.0, 3GPP Organizational Partners, Dec. 2017, 55 pages.
Author Unknown, "Technical Specification Group Radio Access Network NR Radio Resource Conlrol (RRC) protocol specification (Release 15)," Technical Specification 38.331, Version 15.0.0, 3GPP Organizational Partners, Dec. 2017, 188 pages.
Ericsson, "R1-1720733: On remaining details of CSI measurement," 3GPP TSG-RAN WG1 #91, Nov. 27-Dec. 1, 2017, Reno, USA, 10 pages.
Huawei et al., "R2-1712561: Need for new MAC CEs for UL and DL beam management," 3GPP TSG-RAN WG2#100, Nov. 27-Dec. 1, 2017, Reno, Nevada, 10 pages.
Interdigital, Inc., "R1-178338: Remaining Issues on CSI acquisition for NR," 3GPP TSG RAN WG1 Meeting #89, May 15-19, 2017, Hangzhou, P.R. China, 3 pages.
Non-Final Office Action for U.S. Appl. No. 16/268,065, dated May 13, 2019, 10 pages.
Notice of Allowance for U.S. Appl. No. 16/268,065, dated Oct. 30, 2019, 7 pages.
International Search Report and Written Opinion for International Patent Application No. PCT/IB2019/050242, dated Apr. 25, 2019, 18 pages.
International Preliminary Report on Patentability for International Patent Application No. PCT/IB2019/050242, dated Mar. 24, 2020, 24 pages.
Office Action for Colombian Patent Application No. NC2020/0008269, dated Jun. 28, 2021, 17 pages.
Examination Report for Indian Patent Application No. 202047034459, dated Aug. 18, 2021, 7 pages.
Office Action for Israeli Patent Application No. 275460, dated Jul. 5, 2021, 2 pages.
Ericsson, "R1-1702679: CSI Framework," 3GPP TSG-RAN WG1 #88, Feb. 13-17, 2017, Athens, Greece, 7 pages.
LG Electronics, "R1-1707608: Discussion on interference measurement and rate matching for NR," 3GPP TSG RAN WG1 Meeting #89, May 15-19, 2017, Hangzhou, China, 6 pages.
LG Electronics, "R1-1713140: Discussion on rate matching," 3GPP TSG RAN WG1 Meeting #90, Aug. 21-25, 2017, Prague, Czech Republic, 6 pages.
Intention to Grant for European Patent Application No. 19705565.0, dated Jul. 8, 2021, 5 pages.
Notice of Reasons for Rejection for Japanese Patent Application No. 2020-536575, dated Feb. 5, 2021, 8 pages.
Grant of Patent for Korean Patent Application No. 10-2020-7022514, dated Jun. 4, 2021, 4 pages.

* cited by examiner

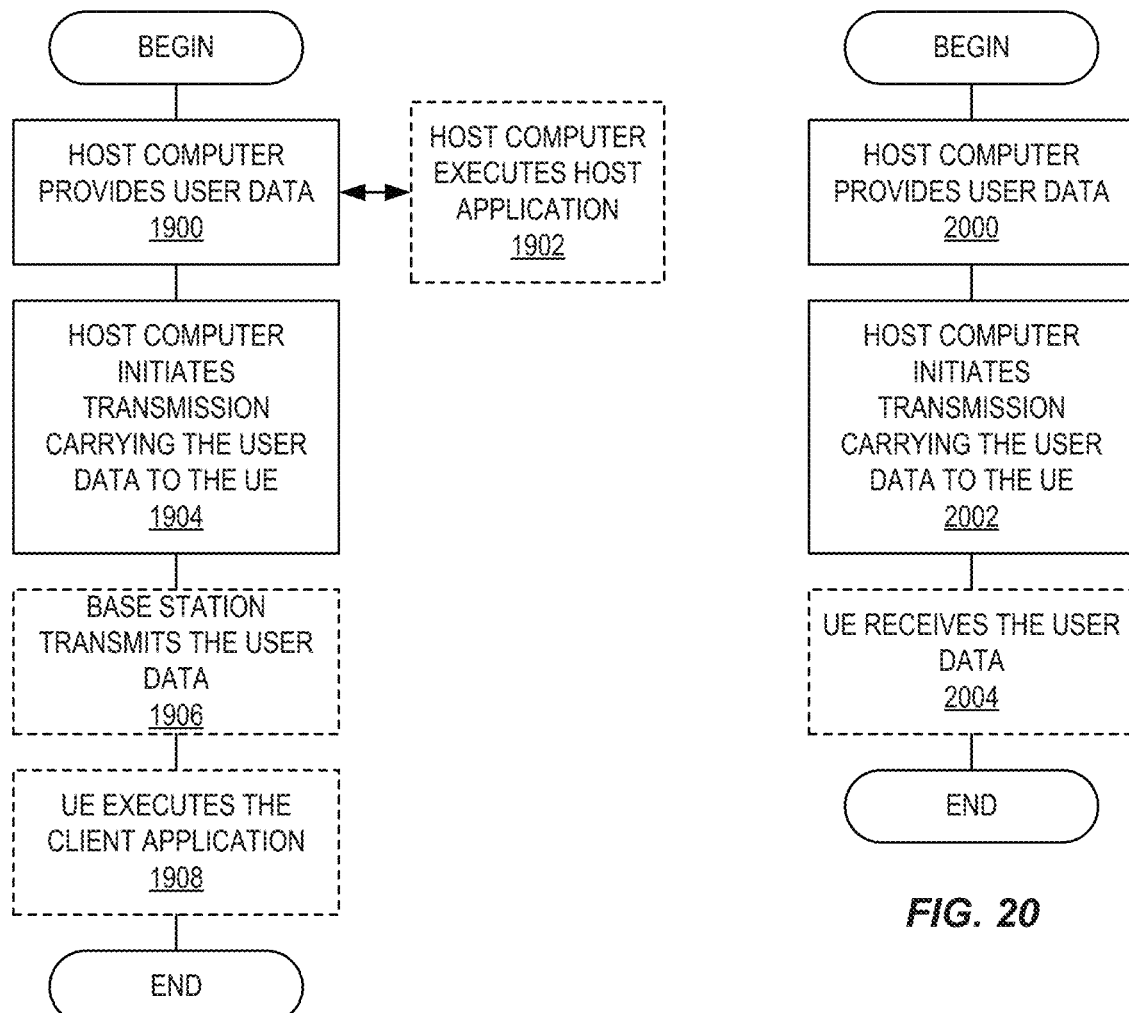

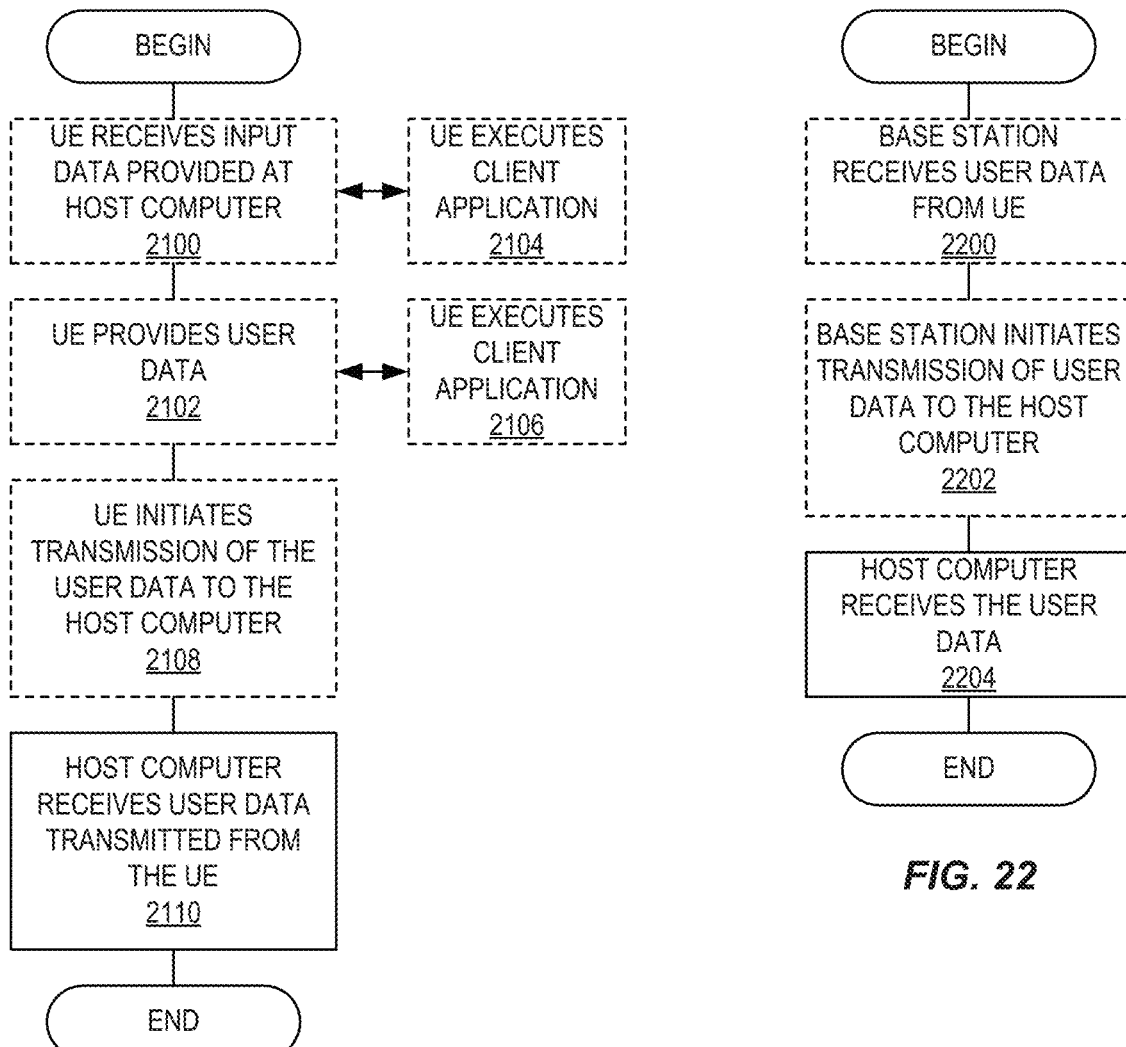

SIGNALING IN RRC AND MAC FOR PDSCH RESOURCE MAPPING FOR PERIODIC AND SEMIPERSISTENT REFERENCE SIGNAL ASSUMPTIONS

RELATED APPLICATIONS

The present application is a continuation of U.S. patent application Ser. No. 16/268,065, filed Feb. 5, 2019, which is a continuation of International Application No. PCT/IB2019/050242, filed Jan. 11, 2019, which claims priority to Provisional Application No. 62/616,981 filed Jan. 12, 2018, the disclosures of which are incorporated herein by reference in their entireties.

TECHNICAL FIELD

The disclosed subject matter relates generally to telecommunications. Certain embodiments relate more particularly to concepts such as resource mapping for reference signal assumptions.

BACKGROUND

In Long Term Evolution (LTE), until Release 13, all Reference Signals (RSs) that a User Equipment (UE) uses for Channel State Information (CSI) calculation, such as Cell specific Reference Signal (CRS) and CSI Reference Signal (CSI-RS), were non-precoded such that UE is able to measure the raw channel and calculate CSI feedback including preferred precoding matrix based on that the RS. As the number of Transmit (Tx) antenna ports increases, the amount of feedback becomes larger. In LTE Release-10, when closed loop precoding with 8Tx was introduced, a two-stage precoder approach was introduced where UE first selects a wideband coarse precoder and then selects a second precoder per subband. Another possible approach is that network beamforms the CSI-RS and UE calculates CSI feedback using the beamformed CSI-RS. This approach was adopted in LTE Release 13 as one option for the Full Dimension Multi-Input Multi-Output (FD-MIMO) operation as described in the next section. Improvements in reference signals are needed.

SUMMARY

Systems and methods for activating a Semi-Persistent (SP) Zero Power (ZP) Channel State Information Reference Signal (CSI-RS) are provided. In some embodiments, a method performed by a wireless device includes for activating SP ZP CSI-RS includes receiving, from a network node, a control message that indicates the activation of one or more SP ZP CSI-RS resources; and activating, based on the control message, the one or more SP ZP CSI-RS resources. In this way, ZP CSI-RS may be used for rate matching around other wireless devices and a SP ZP CSI-RS resource may be activated without activating any Non-Zero Power (NZP) CSI-RS, CSI-Interference Measurement (CSI-IM), or CSI reporting for the wireless device.

In some embodiments, the control message is a Medium Access Control (MAC) Control Element (CE). In some embodiments, the control message is separate from a control message indicating NZP, CSI-RS, CSI-IM, or CSI.

In some embodiments, the control message comprises a bitmap, where each bit in the bitmap indicates if one SP ZP CSI-RS resource set is active or not. In some embodiments, the SP ZP CSI-RS resources which the bitmap refers to is an RRC configured list of SP ZP CSI-RS resources.

In some embodiments, the control message comprises one or more identifiers, where each identifier identifies a pre-configured SP ZP CSI-RS resource set. In some embodiments, the one or more identifiers only contain a single SP CSI-RS resource identifier. In some embodiments, the one or more identifiers refer to at least one SP ZP CSI-RS resource set.

In some embodiments, the one or more activated SP ZP CSI-RS resources are not used for Physical Downlink Shared Channel (PDSCH) transmission.

In some embodiments, the method also includes, in response to activating the one or more SP ZP CSI-RS resources, PDSCH resource mapping around the one or more SP ZP CSI-RS resources.

In some embodiments, the method also includes, receiving, from the network node, a deactivation control message that indicates the deactivation of one or more SP ZP CSI-RS resources; and deactivating, based on the deactivation control message, the one or more SP ZP CSI-RS resources. In some embodiments, the deactivation control message is a MAC CE.

In some embodiments, the method also includes, in response to deactivating the one or more SP ZP CSI-RS resources, PDSCH resource mapping around resources for the one or more SP ZP CSI-RS.

In some embodiments, the network node is a base station. In some embodiments, the network node operates in a Fifth Generation (5G) New Radio (NR) cellular communications network.

In some embodiments, a method performed by a network node for activating a SP ZP CSI-RS includes transmitting, to a wireless device, a control message that indicates the activation of one or more SP ZP CSI-RS resources.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 19-22 are flowcharts illustrating a method implemented in a communication system, according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In LTE, until Release 13, all reference signals (RSs) that UE uses for Channel State Information (CSI) calculation, such as Cell specific Reference Signal (CRS) and CSI Reference Signal (CSI-RS), were non-precoded such that UE is able to measure the raw channel and calculate CSI feedback including preferred precoding matrix based on that the RS. As the number of Transmit (Tx) antenna ports increases, the amount of feedback becomes larger. In LTE Release-10, when closed loop precoding with 8Tx was introduced, a two-stage precoder approach was introduced where UE first selects a wideband coarse precoder and then selects a second precoder per subband. Another possible approach is that network beamforms the CSI-RS and UE calculates CSI feedback using the beamformed CSI-RS. This approach was adopted in LTE Release 13 as one option for the Full Dimension Multi-Input Multi-Output (FD-MIMO) operation as described in the next section.

Figure 1:
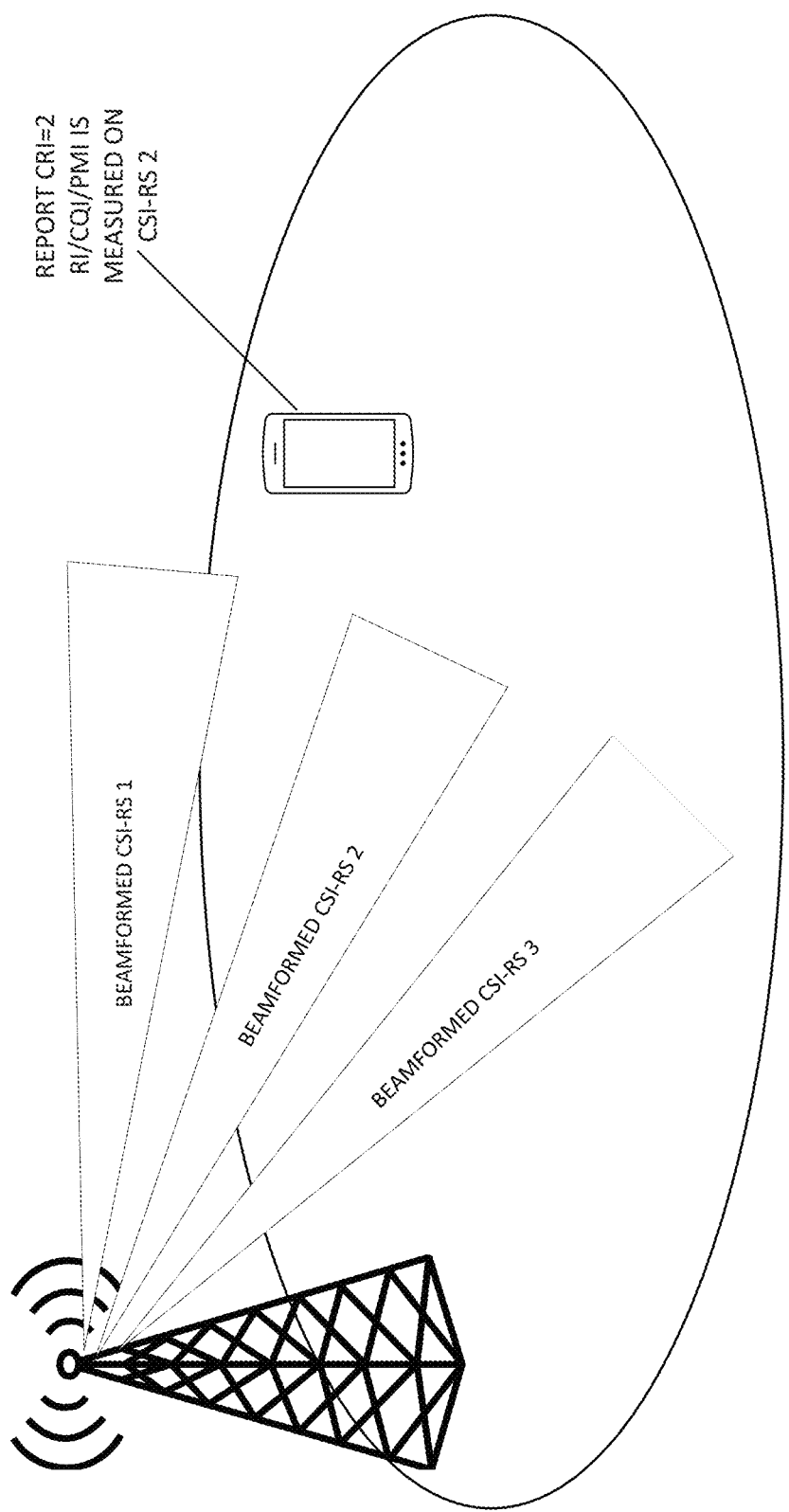
FIG. 1 is an illustration of beamformed Channel State Information Reference Signal (CSI-RS), according to some embodiments of the present disclosure.

Release 13 FD-MIMO specification in LTE supports an enhanced CSI reporting called Class B CSI for beamformed CSI-RS. Therein, an LTE RRC_CONNECTED UE, i.e. a UE connected to an LTE network, can be configured with K CSI-RS resources, where each resource may correspond to a beam (where $1<K\leq8$) where each CSI-RS resource can consist of 1, 2, 4 or 8 CSI-RS ports. For CSI feedback purposes, a CSI-RS Resource Indicator (CRI) was introduced in addition to Precoding Matrix Indicator (PMI), Rank Indicator (RI) and Channel Quality Indicator (CQI). As part of the CSI, the UE reports the CSI-RS index (CRI) to indicate the preferred beam, where the CRI is wideband. Other CSI components such as RI/CQI/PMI are based on legacy codebook (i.e. Release 12) and CRI reporting periodicity is an integer multiple of the RI reporting periodicity. An illustration of beamformed CSI-RS is given in FIG. 1. In the figure, the UE reports CRI=2 which corresponds to RI/CQI/PMI being computed using 'Beamformed CSI-RS 2'.

For Release 14 eFD-MIMO, non-periodic beamformed CSI-RS with two different sub-flavors was introduced. The two sub-flavors are aperiodic CSI-RS and semi-persistent CSI-RS. In both these sub-flavors, the CSI-RS resources are configured for the UE as in Release 13 with K CSI-RS resources, and a Medium Access Control (MAC) Control Element (CE) activation of N out of the K CSI-RS resources ($N\leq K$) is specified. Alternatively stated, after the K CSI-RS resources are configured to be aperiodic CSI-RS or semi-persistent CSI-RS, the UE waits for MAC CE activation of N out of the K CSI-RS resources. In the case of aperiodic CSI-RS, in addition to MAC CE activation, a Downlink Control Information (DCI) trigger is sent to the UE so that one of the activated CSI-RS resources is selected by the UE for CSI computation and subsequent reporting. In the case of semi-persistent CSI-RS, once the CSI-RS resources are activated by MAC CE, the UE can use the activated CSI-RS resources for CSI computation and reporting.

The MAC CE activation/deactivation command is specified in Section 5.19 of Technical Specification (TS) 36.321 where the specification text is reproduced below.

The network may activate and deactivate the configured CSI-RS resources of a serving cell by sending the Activation/Deactivation of CSI-RS resources MAC control element described below. The configured CSI-RS resources are initially deactivated upon configuration and after a handover.

Figure 2A:
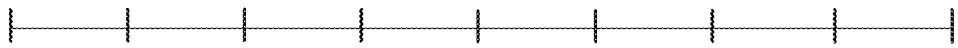
FIGS. 2A and 2B illustrate a method of activating and/or deactivating CSI-RS resources, according to some embodiments of the present disclosure.
Figure 2B:

The Activation/Deactivation of CSI-RS resources MAC control element is identified by a MAC PDU subheader with a Logical Channel IDentifier (LCID) as specified in table 6.2.1-1. It has variable size as the number of configured CSI process (N) and is defined in FIG. 2A. Activation/Deactivation CSI-RS command is defined in FIG. 2B and activates or deactivates CSI-RS resources for a CSI process. Each CSI process is associated with one or more CSI-RS resource and one or more CSI-Interference Measurement (CSI-IM) resources. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements is defined as follows:

$R_i$: this field indicates the activation/deactivation status of the CSI-RS resources associated with CSI-RS-ConfigNZPId i for the CSI-RS process. The $R_i$ field is set to "1" to indicate that CSI-RS resource associated with CSI-RS-ConfigNZPId i for the CSI-RS process shall be activated. The Ri field is set to "0" to indicate that the CSI-RS-ConfigNZPId i shall be deactivated;

The MAC activation was introduced in LTE to be able to configure the UE with more CSI-RS resources than the maximum number of CSI-RS resources the UE is able to support for CSI feedback. The MAC CE would then selectively activate up to the maximum number of CSI-RS resources supported by the UE for CSI feedback. The benefit of MAC CE activation for CSI-RS is that the network may, without the need to reconfigure by Radio Resource Control (RRC) layer, activate another set of N CSI-RS resources among the K resources configured for the UE.

Figure 3:
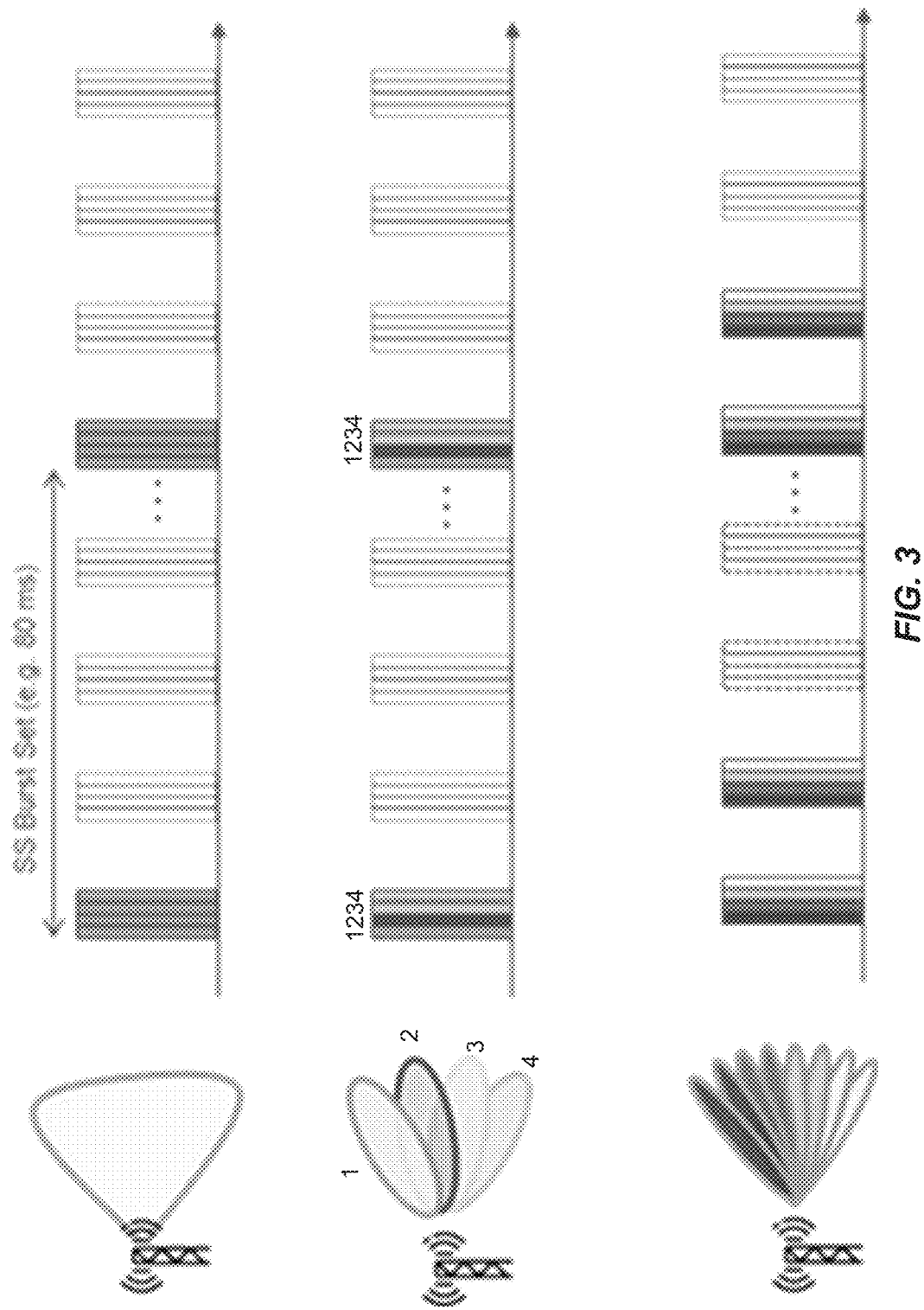
FIG. 3 illustrates various single beam scenarios and multi-beam scenarios, according to some embodiments of the present disclosure.

For NR, all reference signals may be beamformed. In NR, the synchronization sequences (SS), both primary (NR-PSS) and the secondary (NR-SSS), and Physical Broadcast CHannel (PBCH), which includes Demodulated Reference Signals (DMRSs), constitute a so called SS Block. An RRC_CONNECTED UE trying to access a target cell should assume that the SS Block may be transmitted in the form of repetitive bursts of SS Block transmissions (denoted as "SS Burst"), wherein such a burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. As shown in FIG. 3, in single beam scenarios, the network could configure time-repetition within one SS Burst in a wide beam. In multi-beam scenarios, at least some of these signals and physical channels (e.g. SS Block) would be transmitted in multiple beams, which could be done in different manners depending on network implementation, as shown in FIG. 3.

Which of these three alternatives to implement is a network vendor choice. That choice depends on the tradeoff between i) the overhead caused by transmitting periodic and always on narrow beam sweepings vs. ii) the delays and signaling needed to configure the UE to find a narrow beam for Physical Downlink Shared Channel (PDSCH) and Physical Downlink Control Channel (PDCCH). The implementation shown in the upper figure within FIG. 3 prioritizes i), while the implementation shown in the bottom figure within FIG. 3 prioritizes ii). The figure in the middle case is an intermediate case, where a sweeping of wide beams is used. In that case, the number of beams to cover the cell is reduced, but in some cases an additional refinement is needed for narrow gain beamforming of PDSCH.

In NR, the following types of CSI reporting are supported:
Periodic CSI Reporting (P CSI Reporting): CSI is reported periodically by the UE. Parameters such as periodicity and slot offset are configured semi-statically, by higher layer signaling from the gNB to the UE.
Aperiodic CSI Reporting (AP CSI Reporting): This type of CSI reporting involves a single-shot (i.e., one time) CSI report by the UE which is dynamically triggered by the gNB, e.g. by the DCI in PDCCH. Some of the parameters related to the configuration of the aperiodic CSI report are semi-statically configured from the gNB to the UE but the triggering is dynamic.
Semi-Persistent CSI Reporting (SP CSI Reporting): similar to periodic CSI reporting, semi-persistent CSI reporting has a periodicity and slot offset which may be semi-statically configured by the gNB to the UE. However, a dynamic trigger from gNB to UE may be needed to allow the UE to begin semi-persistent CSI reporting. In some cases, a dynamic trigger from gNB to UE may be needed to command the UE to stop the semi-persistent transmission of CSI reports. For SP CSI Reporting on physical uplink shared channel (PUSCH), the dynamic trigger is via DCI. For SP CSI Reporting on physical uplink control channel (PUCCH), MAC CE is used to activate/deactivate SP CSI reporting.

Generally, a CSI report setting contains the parameters associated with CSI reporting including the type of CSI reporting.

In NR, the following three types of CSI-RS transmissions are supported:
Periodic CSI-RS (P CSI-RS): CSI-RS is transmitted periodically in certain slots. This CSI-RS transmission is semi-statically configured using parameters such as CSI-RS resource, periodicity, and slot offset.
Aperiodic CSI-RS (AP CSI-RS): This is a one-shot CSI-RS transmission that can happen in any slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH. The triggering may also include selecting a CSI-RS resource from multiple CSI-RS resources. Multiple aperiodic CSI-RS resources can be grouped into a CSI-RS resource set.
Semi-Persistent CSI-RS (SP CSI-RS): Similar to periodic CSI-RS, resources for semi-persistent CSI-RS transmissions are semi-statically configured with parameters such as periodicity and slot offset. However, unlike periodic CSI-RS, dynamic signaling is needed to activate and deactivate the CSI-RS transmission.

In the case of aperiodic CSI-RS and/or aperiodic CSI reporting, the gNB RRC configures the UE with $S_c$ CSI triggering states. Each triggering state contains the aperiodic CSI report setting to be triggered along with the associated aperiodic CSI-RS resource sets.

When the DCI contains a CSI request field with N bits, aperiodic CSI-RS and/or aperiodic CSI reporting can be triggered according to the following conditions:
a Condition 1: When the number of triggering states $S_c \leq (2^N-1)$, MAC CE activation/deactivation is not used and DCI will trigger one out of the $S_c$.
Condition 2: When the number of triggering states $S_c > (2^N-1)$, MAC CE activation is used to activate $(2^N-1)$ triggering states. Then, DCI will trigger the aperiodic CSI-RS and/or aperiodic CSI reporting associated with one out of the $(2^N-1)$ triggering states. MAC CE can deactivate the currently active triggering states and activate a new set of $(2^N-1)$ triggering states.

In NR, the size of the CSI request field is configurable and can take on values of N={0, 1, 2, . . . , 6}.

In the case of semi-persistent CSI-RS, the gNB first RRC configures the UE with the semi-persistent CSI-RS resources. The semi-persistent CSI-RS resource or semi-persistent CSI-RS resource set is then activated via MAC CE.

Quasi co-location (QCL) is a natural way to describe the relation between two different signals originating from the same Transmission Reception Point (TRP) and that can be received using the same spatial receiver parameters. As an example, the UE should be able to assume it can use the same receive beam when receiving the two difference signals that have spatial QCL. The spatial QCL relations between different types of reference RS and target RS are shown in the table below. Also, shown in the table are the associated signaling methods. The last column of the table simply indicates that the target and reference RSs can belong to different component carriers (CCs) and different bandwidth parts (BWPs).

| QCL parameter | Reference RS | Target RS | Signaling method | Reference RS and Target RS should belong to the same CC/BWP or not |
|---|---|---|---|---|
| Spatial | SS Block (SSB) | P CSI-RS | RRC | Can be on different CCs/BWPs |
| Spatial | SSB | SP CSI-RS | SP CSI-RS activation signal | Can be on different CCs/BWPs |
| Spatial | P CSI-RS | Another P CSI-RS | RRC | Can be on different CCs/BWPs |
| Spatial | SSB or P/SP CSI-RS | AP CSI-RS | RRC or RRC + MAC CE for configuration, indication with DCI | Can be on different CCs/BWPs |

For measurements on channel and interference, two types of resources are defined, non-zero power (NZP) CSI-RS and CSI-IM. NZP CSI-RS is transmitted by a network node (or gNB) for UEs to estimate the downlink channels to the network node. While for CSI-IM, a resource, as given by a set of REs, is indicated by the network for the UE to perform interference measurements upon.

Zero-power (ZP) CSI-RS resources can also be configured to the UEs. As its name implies, the gNB does not transmit anything on the Resource Elements (REs) occupied by the ZP CSI-RS configured to the UE. ZP CSI-RS resources are configured to the UEs for three purposes. Firstly, ZP CSI-RS can be configured to a UE in order to protect NZP CSI-RS transmissions from one or more neighboring cells. Secondly, ZP CSI-RS can be used for the purposes of indicating whether or not PDSCH is mapped to CSI-IM. Thirdly, (aperiodic) ZP CSI-RS can be used to indicate that the UE shall rate match, e. g. PDSCH resource mapping, its PDSCH around a (beamformed) NZP CSI-RS intended for another UE to measure upon. It is mainly for this third purpose the aperiodic ZP CSI-RS field in the Downlink (DL) DCI is comprised.

In a typical use case, the network will not transmit anything on the REs occupied by the CSI-IM, so the UE can measure the inter-cell interference thereon. To indicate that the PDSCH is not mapped to the REs occupied by the CSI-IM, ZP CSI-RS is typically configured to overlap with the CSI-IM. As the CSI-IM and ZP CSI-RS resources typically overlap, the CSI-IM is colloquially referred to as a ZP CSI-RS based interference measurement resource (IMR). The IMR can be aperiodic (AP IMR), semi-persistent (SP IMR) or periodic IMR (P IMR). Note that in NR, an NZP CSI-RS can also be configured as an IMR.

Figure 4:
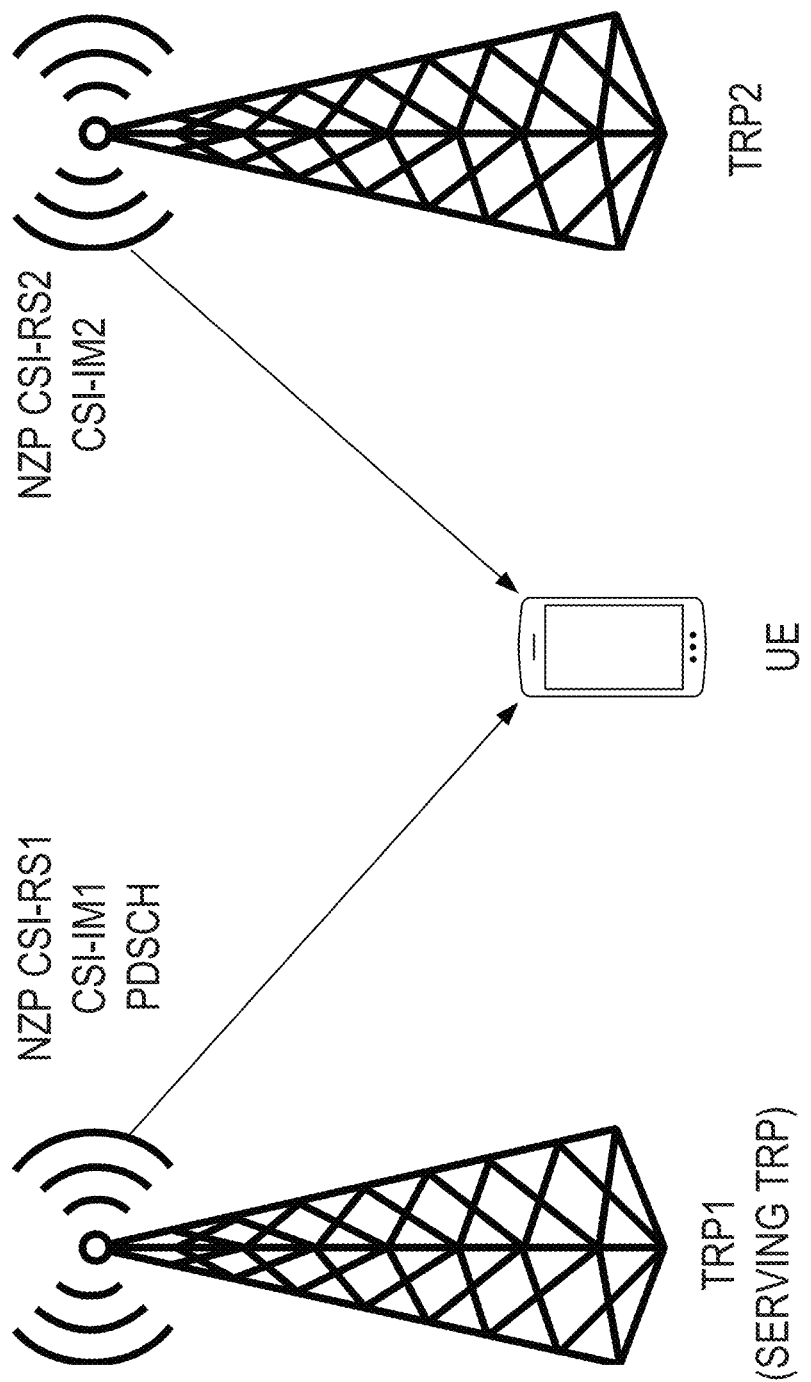
FIG. 4 illustrates an example of multiple Transmission Reception Points (TRPs), according to some embodiments of the present disclosure.

It should be noted that ZP CSI-RS used for the purposes of indicating whether or not PDSCH is mapped to CSI-IM is configured independently. To illustrate the reasoning for this, consider the multiple TRP example in FIG. 4. In this example, the UE is currently being served by TRP1 and receives PDSCH from TRP1. TRP2 is a potential future serving cell. For CSI measurements corresponding to TRP1, the UE is configured with NZP CSI-RS1 and CSI-IM1 to measure the desired channel from TRP1 and the interference from TRP2, respectively. For CSI measurements corresponding to TRP2, the UE is configured with NZP CSI-RS2 and CSI-IM2 to measure the desired channel from TRP2 and the interference from TRP1, respectively. When the UE measures CSI corresponding to TRP2, the PDSCH from TRP1 that is currently received by the UE serves as the interference. Hence, in this case, PDSCH mapping should be allowed on REs corresponding to CSI-IM2 and a ZP CSI-RS does not need to be independently configured to overlap with CSI-IM2. For this reason, ZP CSI-RS and CSI-IM is configured independently. Currently, NR supports aperiodic ZP CSI-RS (AP ZP CSI-RS) and periodic ZP CSI-RS (P ZP CSI-RS).

In the rest of this document, a SP CSI-RS used for channel measurement purposes (also known as channel measurement resource or CMR) is also referred to as SP CMR.

In NR, the following was agreed to be supported for pairing a channel measurement resource (CMR) and an IMR:

For ZP CSI-RS based IMR (i.e., CSI-IM), following combinations of P/SP/AP CMR and IMR are supported For semi-persistent CSI reporting,

|  | P CMR | SP CMR | AP CMR |
|---|---|---|---|
| P IMR | YES | NO | NO |
| SP IMR | NO | YES | NO |
| AP IMR | NO | NO | NO |

For aperiodic CSI reporting,

|  | P CMR | S CMR | AP CMR |
|---|---|---|---|
| P IMR | YES | NO | NO |
| SP IMR | NO | YES | NO |
| AP IMR | NO | NO | YES |

As indicated by the agreement above, for CSI acquisition, semi-persistent channel measurement resource (CMR) must be used together with semi-persistent interference measurement resource (IMR). That is, a SP CMR cannot be used with a P IMR or an AP IMR and can only be used with a SP IMR.

There currently exist certain challenge(s). It is still open on how to indicate whether or not PDSCH is mapped to resources of SP IMR.

One option is to use different MAC CEs for the following:
  activation of a SP CSI-RS with QCL reference for channel measurement
  activation of a SP IMR for interference measurement
  activation of SP CSI reporting on PUCCH Another issue is that only aperiodic and periodic ZP CSI-RS is supported for NR, this implies that semi-persistent CSI-RS of other UEs and/or cells must either be protected by periodic ZP CSI-RS, in which the PDSCH will be rate matched around even when the SP NZP CSI-RS is deactivated, or, using aperiodic ZP CSI-RS, which removes the possibility to indicate rate matching around aperiodic ZP CSI-RS. Neither of these options is attractive.

Certain aspects of the present disclosure and their embodiments may provide solutions to the aforementioned or other challenges. For rate matching around a UE's own SP CSI-IM, A solution where semi-persistent ZP CSI-RS resources are used to indicate whether or not PDSCH is mapped to semi-persistent IMR (or SP CSI-IM). Since both SP CSI-RS and SP CSI-IM are activated via MAC CE in NR, it would be appropriate to use the same MAC CE that activates a SP CSI-RS and SP CSI-IM to also activate SP ZP CSI-RS. Optionally, the same MAC CE can also be used to activate an SP CSI.

Systems and methods for activating a Semi-Persistent (SP) Zero Power (ZP) Channel State Information Reference Signal (CSI-RS) are provided. In some embodiments, a method performed by a wireless device includes for activating SP ZP CSI-RS includes receiving, from a network node, a control message that indicates the activation of one or more SP ZP CSI-RS resources; and activating, based on the control message, the one or more SP ZP CSI-RS resources. In this way, ZP CSI-RS may be used for rate matching around other wireless devices and a SP ZP CSI-RS resource may be activated without activating any Non-Zero Power (NZP) CSI-RS, CSI-Interference Measurement (CSI-IM), or CSI reporting for the wireless device.

For rate matching around other UEs' SP CSI-IM, a separate MAC CE message other than the one for SP CSI-RS, SP CSI-IM, or SP CSI reporting is used to activate/deactivate SP ZP CSI-RS resources.

Alternatively, a common SP CSI-IM may be configured for all UEs and a periodic ZP CSI-RS may be configured with the same resource as the SP CSI-IM without any additional dynamic signaling for rate matching around SP CSI-IM. In another option, a common SP ZP CSI-RS may be configured which is enable when at least one SP CSI reporting is activated and disabled when all SP CSI reporting are deactivated. The enabling and disabling can be done through MAC control messages.

Certain embodiments may provide one or more of the following technical advantage(s). For rate matching around a UE's own SP CSI-IM, an advantage of both embodiments may be that a signaling overhead is reduced when compared to using different MAC CE messages for activating SP CMR, SP IMR, SP ZP CSI-RS, and SP CSI reporting on PUCCH.

For rate matching around other UEs' SP CSI-IM, the embodiments allow either flexible rate matching with low resource overhead or simple signaling.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 5:
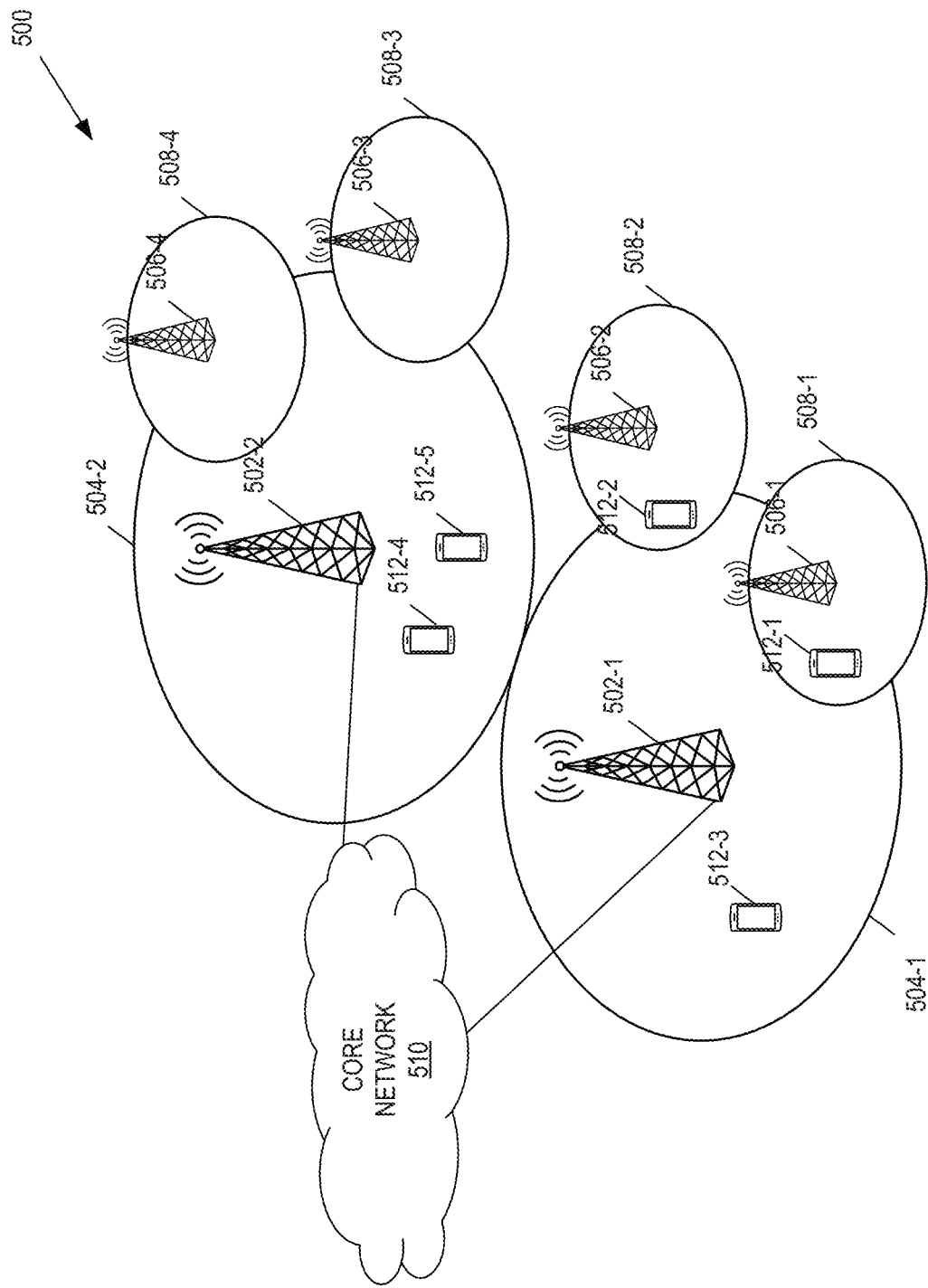
FIG. 5 illustrates one example of a cellular communications network, according to some embodiments of the present disclosure.

FIG. 5 illustrates one example of a cellular communications network 500 according to some embodiments of the present disclosure. In the embodiments described herein, the cellular communications network 500 is a Fifth Generation (5G) New Radio (NR) network. In this example, the cellular communications network 500 includes base stations 502-1 and 502-2, which in LTE are referred to as eNBs and in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 also includes a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Figure 6:
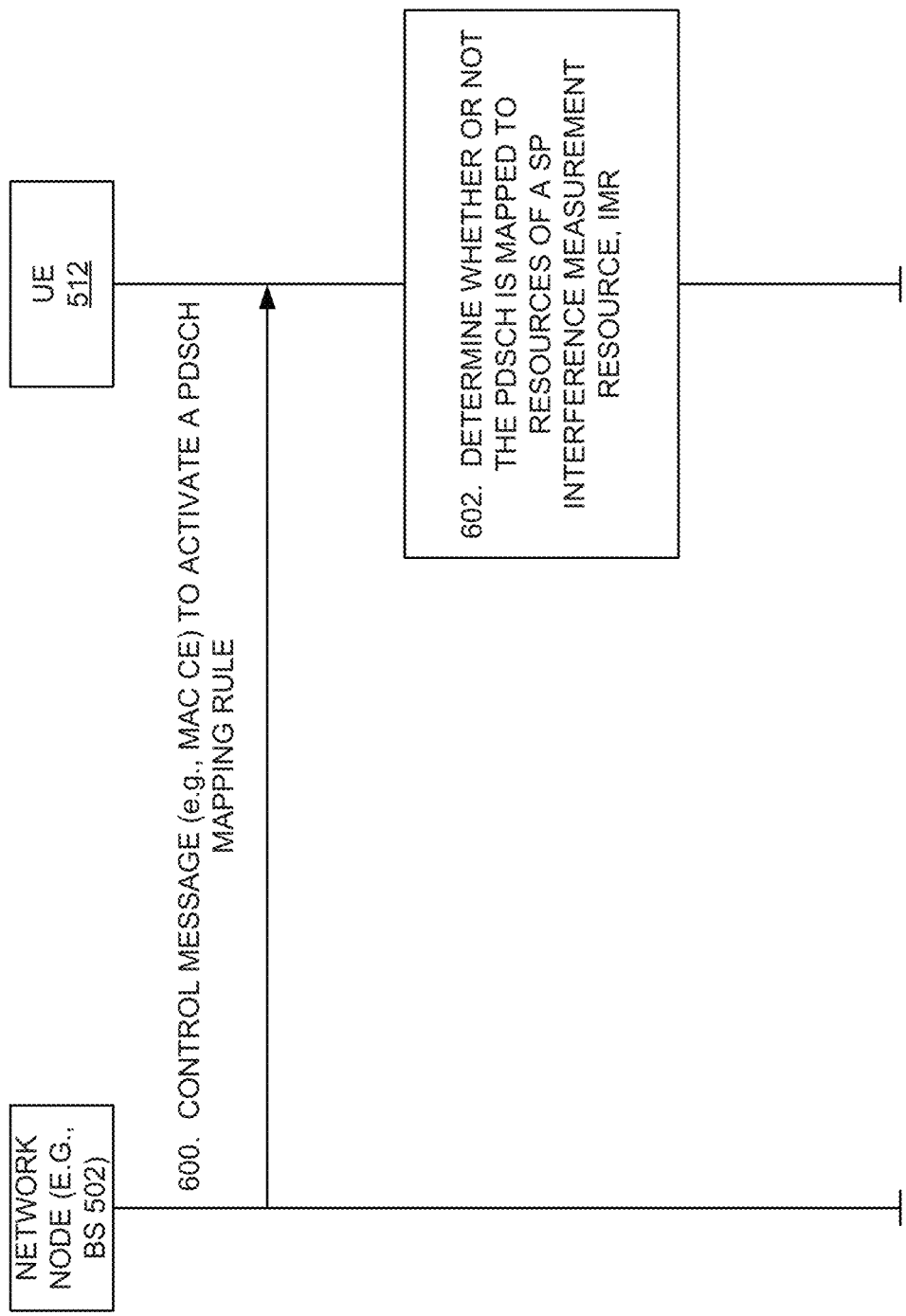
FIGS. 6-8 illustrate examples of the operation of a network node and a wireless device for activating a Semi-Persistent (SP) Zero Power (ZP) CSI-RS, according to some embodiments of the present disclosure.

Various embodiments for activation and deactivation of SP-CSI reporting on PUSCH are described below. In this regard, FIG. 6 illustrates one example of the operation of a network node (e.g., a base station 502) and a wireless device 512 for activating a PDSCH mapping rule in accordance with some embodiments of the present disclosure. As illustrated, the network node sends, to the wireless device 512, a control message (e.g., a MAC CE) to activate a PDSCH mapping rule (step 600). Then, the wireless device 512 determines whether or not the PDSCH is mapped to resources of a SP IMR (step 602). There are various embodiments discussed below.

Figure 7:
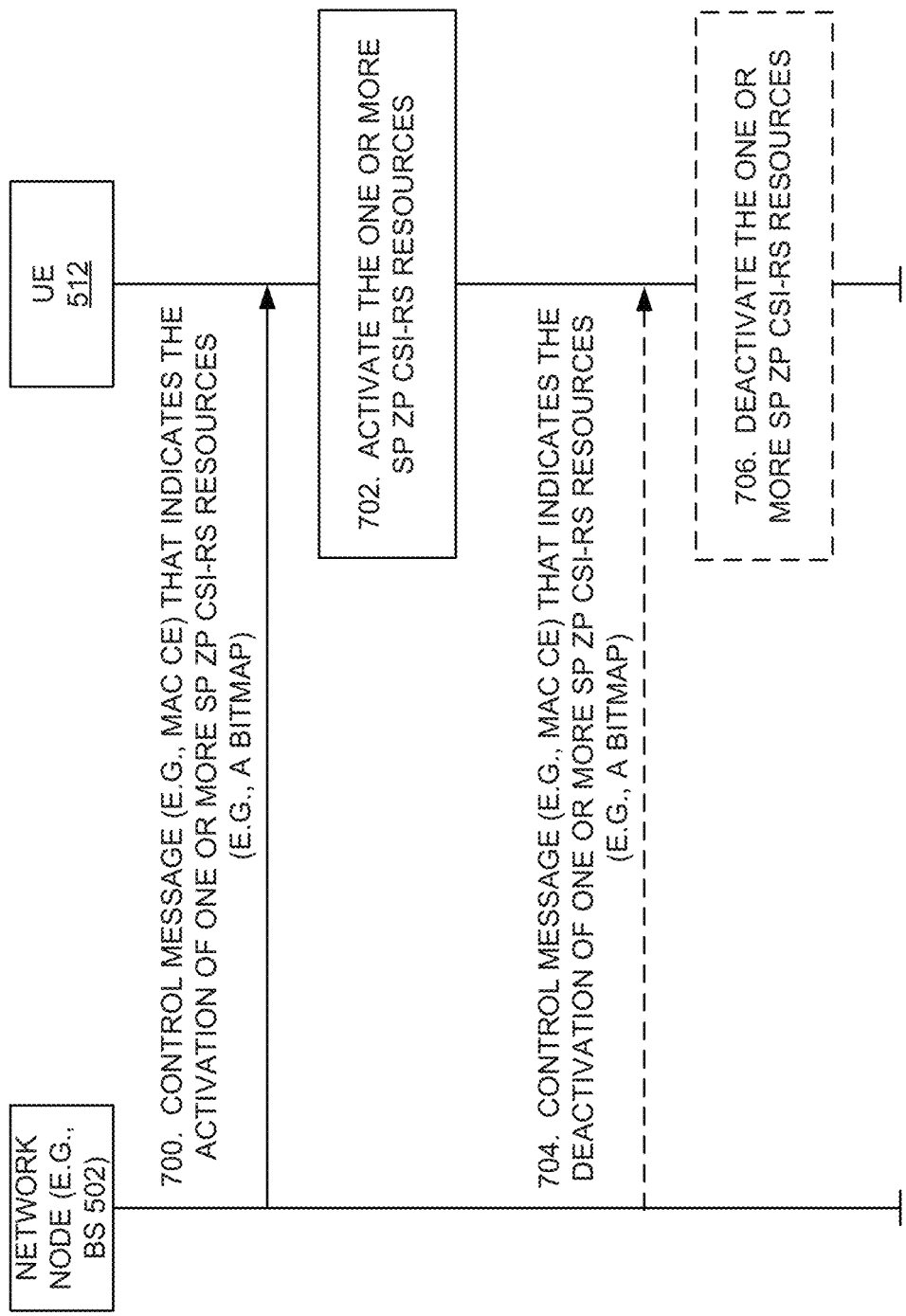

FIG. 7 illustrates one example of the operation of a network node (e.g., a base station 502) and a wireless device 512 for activating a Semi-Persistent, SP, Zero Power, ZP, Channel State Information Reference Signal, CSI-RS in accordance with some embodiments of the present disclosure. As illustrated, the network node sends, to the wireless device 512, a control message (e.g., a MAC CE) that indicates activation of one or more a SP ZP CSI-RS resources (e.g., a bitmap) (step 700). Then, the wireless device 512 activates the one or more SP ZP CSI-RS resources (step 702). Similarly, the network node may optionally send, to the wireless device 512, a control message (e.g., a MAC CE) that indicates deactivation of one or more a SP ZP CSI-RS resources (e.g., a bitmap) (step 704). Then, the wireless device 512 deactivates the one or more SP ZP CSI-RS resources (step 706). There are various embodiments discussed below.

Figure 8:
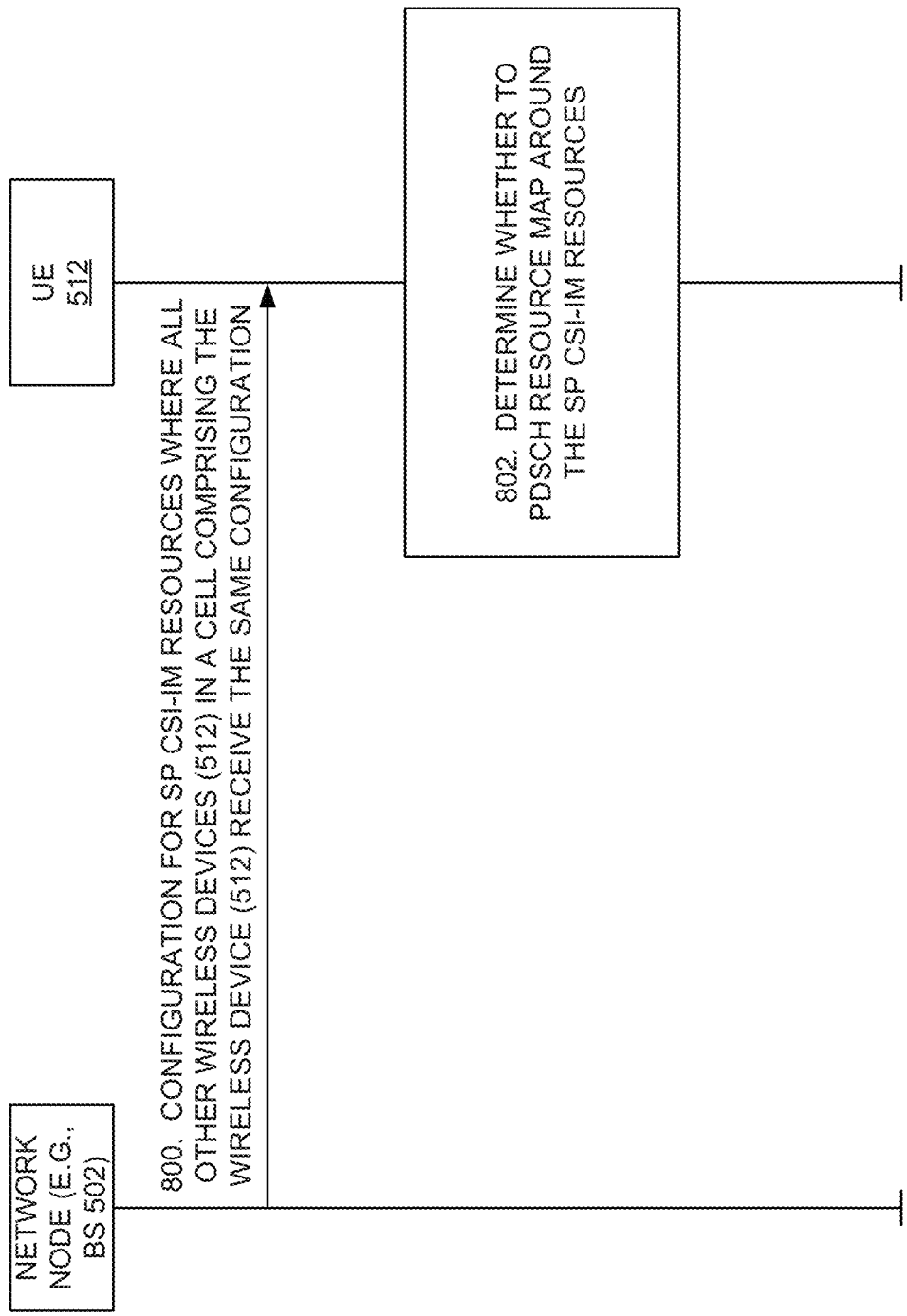

FIG. 8 illustrates one example of the operation of a network node (e.g., a base station 502) and a wireless device 512 for activating a Semi-Persistent, SP, Zero Power, ZP, Channel State Information Reference Signal, CSI-RS in accordance with some embodiments of the present disclosure. As illustrated, the network node sends, to the wireless device 512, a configuration for SP CSI-IM resources where all other wireless devices (512) in a cell comprising the wireless device (512) receive the same configuration (step 800). The wireless device 512 then determines whether to rate match, e.g., PDSCH resource map, around the SP CSI-IM resources (step 802).

In NR, it is agreed that for CSI acquisition, semi-persistent channel measurement resource (CMR) must be used together with semi-persistent CSI-IM. However, it is still not decided how to indicate to the UE whether or not PDSCH is mapped to the REs occupied by the semi-persistent CSI-IM. One solution is to introduce semi-persistent ZP CSI-RS (SP ZP CSI-RS) resources which are configured to the UE independently from semi-persistent CSI-IM. Since both SP CSI-RS and SP CSI-IM are activated via MAC CE, it would be appropriate to use the same MAC CE that activates a SP CSI-RS and SP CSI-IM to also activate SP ZP CSI-RS. Optionally, the same MAC CE can also be used to activate a SP CSI report on PUCCH. One further benefit of introducing a SP ZP CSI-RS is that it allows the gNB to indicate rate matching around another UEs SP NZP CSI-RS, or, to protect a SP NZP CSI-RS of another cell.

As per 3GPP RAN1 agreements, a periodic reporting configuration can be linked to only a periodic RS configuration and semipersistent reporting can be linked to either a periodic or a semipersistent (P/SP) RS configuration. Some embodiments describe an RRC configuration which gives rate matching assumption for periodic and semipersistent reference signal configuration.

In the subsequent embodiments, two different ways of signaling for MAC CE activation of SP ZP CSI-RS for PDSCH resource mapping are provided. In these embodiments, the same MAC CE that is used to activate SP CMR and SP CSI-IM is used to activate SP ZP CSI-RS for resource mapping. This MAC CE message can also indicate whether or not PDSCH is mapped to semi-persistent CSI-IM. In some embodiments, this MAC CE can also activate SP CSI reporting on PUCCH.

An advantage of both embodiments may be that a signaling overhead is reduced when compared to using different MAC CE messages for activating SP CMR, SP CSI-IM, SP ZP CSI-RS, and SP CSI reporting on PUCCH.

In this Embodiment 1, the linkage between SP CMR, SP CSI-IM, and SP ZP CSI-RS can be given in either MeasLinkConfig or ReportConfig for CSI reporting. Here, MeasLinkConfig and ReportConfig are RRC information elements (IE) representing measurement link configurations and reporting configurations, respectively. To indicate to the UE that PDSCH is not mapped to the resources of SP CSI-IM, all three entities (i.e., SP CMR, SP CSI-IM, and SP ZP CSI-RS) are present in either MeasLinkConfig or ReportConfig. To indicate to the UE that PDSCH is mapped to the resources of SP CSI-IM, only SP CMR and SP CSI-IM are present in either MeasLinkConfig or ReportConfig. Then, in the field description of either of these IEs, depending where the linkage ends up to be in final specification, it will be described that if SP ZP-CSI-RS is present, UE assumes SP ZP-CSI-RS for rate matching instead of CSI-IM. Each such linkage can be associated with an Identifier (ID) (henceforth referred to as measID or reportID). Then, the activation of SP CMR, SP CSI-IM and/or SP ZP CSI-RS can be done by pointing only to either measID or reportID in a MAC CE.

In another variant of this embodiment, in addition to SP CMR, SP CSI-IM, and SP ZP CSI-RS, a joint activation of a SP CSI reporting on PUCCH is performed using the same MAC CE. In this variant, the SP CSI-RS used for CMR can be defined in an RRC configured parameter SP-CSI-RS Config. SP-CSI-RS Config can include the corresponding SP CSI-IM and a report ID corresponding to a ReportConfig. The ReportConfig contains the details of the SP CSI reporting on PUCCH to be activated. Depending on whether or not PDSCH is mapped to the corresponding SP CSI-IM, SP-CSI-RS config can also include SP ZP CSI-RS. To indicate to the UE that PDSCH is not mapped to the resources of SP CSI-IM, the SP ZP CSI-RS corresponding to the SP CSI-IM is included in the SP-CSI-RS config. To indicate to the UE that PDSCH is mapped to the resources of SP CSI-IM, the SP ZP CSI-RS corresponding to the SP CSI-IM is not included in the SP-CSI-RS config.

In yet another variant embodiment, the SP CMR, SP CSI-IM and the SP CSI reporting on PUCCH are defined in a MeasLinkConfig with a measID. Depending on whether or not PDSCH is mapped to the corresponding SP CSI-IM, the MeasLinkConfig can also include SP ZP CSI-RS. To indicate to the UE that PDSCH is not mapped to the resources of SP CSI-IM, the SP ZP CSI-RS corresponding to the SP CSI-IM is included in MeasLinkConfig. To indicate to the UE that PDSCH is mapped to the resources of SP CSI-IM, the SP ZP CSI-RS corresponding to the SP CSI-IM is not included in MeasLinkConfig. 1n this variant of the embodiment, a MAC CE indicates the measID to jointly activate a given combination of SP CMR, SP CSI-IM, SP CSI reporting, and/or SP ZP CSI-RS.

In another variant of the embodiment, the SP CMR, SP CSI-IM, and the SP CSI reporting on PUCCH are defined in a ReportConfig with reportID. Depending on whether or not PDSCH is mapped to the corresponding SP CSI-IM, the ReportConfig can also include SP ZP CSI-RS. To indicate to the UE that PDSCH is not mapped to the resources of SP CSI-IM, the SP ZP CSI-RS corresponding to the SP CSI-IM is included in ReportConfig. To indicate to the UE that PDSCH is mapped to the resources of SP CSI-IM, the SP ZP CSI-RS corresponding to the SP CSI-IM is not included in ReportConfig. In this variant of the embodiment, a MAC CE then indicates the reportID to jointly activate a given combination of SP CMR, SP CSI-IM, SP ZP CSI-RS, and SP CSI reporting.

In Embodiment 2, a bit R1 in the MAC CE activating the SP CSI-IM indicates whether or not PDSCH is mapped to the SP CSI-IM.

In one detailed variant of this embodiment, the linkage between SP CMR, SP CSI-IM, and SP ZP CSI-RS can be given in either MeasLinkConfig or ReportConfig. In this embodiment, all three entities (i.e., SP CMR, SP CSI-IM, and SP ZP CSI-RS) are present in either MeasLinkConfig or ReportConfig. If the bit R1 is set to "1", then PDSCH is not mapped to the resources of SP CSI-IM and PDSCH is mapped around the resources in SP ZP CSI-RS. If R1 is set to "0", PDSCH is mapped to the resources of SP CSI-IM and the SP ZP CSI-RS defined in either MeasLinkConfig or ReportConfig is ignored. In this embodiment, the activation of SP CMR, SP CSI-IM and/or SP ZP CSI-RS can be done by pointing only to either measID or reportID in a MAC CE which also contains the dedicated bit R1.

In another detailed variant of this embodiment, in addition to SP CMR, SP CSI-IM, and SP ZP CSI-RS, a joint activation of a SP CSI reporting on PUCCH is performed using the same MAC CE. In this variant, the SP CSI-RS used for CMR can be defined in an RRC configured parameter SP-CSI-RS Config. SP-CSI-RS config can include the corresponding SP CSI-IM, SP ZP CSI-RS and a report ID corresponding to a ReportConfig. The report config contains the details of the SP CSI reporting on PUCCH to be activated. If the bit R1 is set to "1", then PDSCH is not mapped to the resources of SP CSI-IM and PDSCH is mapped around the resources in SP ZP CSI-RS. If R1 is set to "0", PDSCH is mapped to the resources of SP CSI-IM and the SP ZP CSI-RS defined in SP-CSI-RS config is ignored.

In yet another detailed variant of this embodiment, the SP CMR, SP CSI-IM, SP ZP CSI-RS and the SP CSI reporting on PUCCH are defined in a MeasLinkConfig with a measID. If the bit R1 is set to "1", then PDSCH is not mapped to the resources of SP CSI-IM and PDSCH is mapped around the resources in SP ZP CSI-RS. If R1 is set to "0", PDSCH is mapped to the resources of SP CSI-IM and the SP ZP CSI-RS defined in MeasLinkConfig is ignored. In this variant of the embodiment, a MAC CE indicates the measID along with dedicated bit R1 to jointly activate a given combination of SP CMR, SP CSI-IM, SP CSI reporting, and/or SP ZP CSI-RS.

In another detailed variant of the embodiment, the SP CMR, SP CSI-IM, and the SP CSI reporting on PUCCH are defined in a ReportConfig with reportID. If the bit R1 is set to "1", then PDSCH is not mapped to the resources of SP CSI-IM and PDSCH is mapped around the resources in SP ZP CSI-RS. If R1 is set to "0", PDSCH is mapped to the resources of SP CSI-IM and the SP ZP CSI-RS defined in ReportConfig is ignored. In this variant of the embodiment, a MAC CE indicates the reportiD along with dedicated bit R1 to jointly activate a given combination of SP CMR, SP CSI-IM, SP ZP CSI-RS, and SP CSI reporting.

In yet another variant of this embodiment, no configuration of SP ZP CSI-RS resource in MeasLinkConfig or ReportConfig is required as the rate matching of PDSCH around the SP CSI-IM can be controlled directly by the bit R1. If R1 is set to 1 then PDSCH is not mapped to the resource elements of the SP CSI-IM while the opposite occurs if R1 is set to 0.

With regard to embodiment 3, since ZP CSI-RS may be used for rate matching, e.g., PDSCH resource mapping, around other UEs NZP CSI-RS it may be beneficial to activate a SP ZP CSI-RS resource without activating any NZP CSI-RS, CSI-IM, or CSI reporting for the UE. Therefore, in some embodiments, a separate MAC CE message is used to activate/deactivate SP ZP CSI-RS resources. In some embodiments, the activation/deactivation message comprises a bitmap of N bits, where each bit in the bitmap indicates if one SP ZP CSI-RS resource is activate or not. The SP ZP CSI-RS resources which the bitmap refers to may be an RRC configured list of SP ZP CSI-RS resources.

In other embodiments, the activation/deactivation message may comprise a list of SP ZP CSI-RS resource identifier to be activated/deactivated. The list may in some embodiments be of size one and thus only contains a single SP CSI-RS resource identifier. Furthermore, each entry in the list may be accompanied by another bit which indicates if the SP CSI-RS resource is activated or deactivated.

In this case the UE side assumption is that when ZP-CSI-RS is activated, UE rate matches, e.g., PDSCH resource map, around this ZP-CSI RS and not around possible active CSI-IM resource. When ZP-CSI RS is deactivated, UE rate matches around an active CSI-IM, and other default assumption.

In some embodiments, a corresponding RRC configuration for periodic RS is that if in RS resource configuration for periodic RS, a ZP-CSI-RS configuration is present, UE rate matches around this ZP-CSI RS and not around the configured CSI-IM resource.

Figure 9:
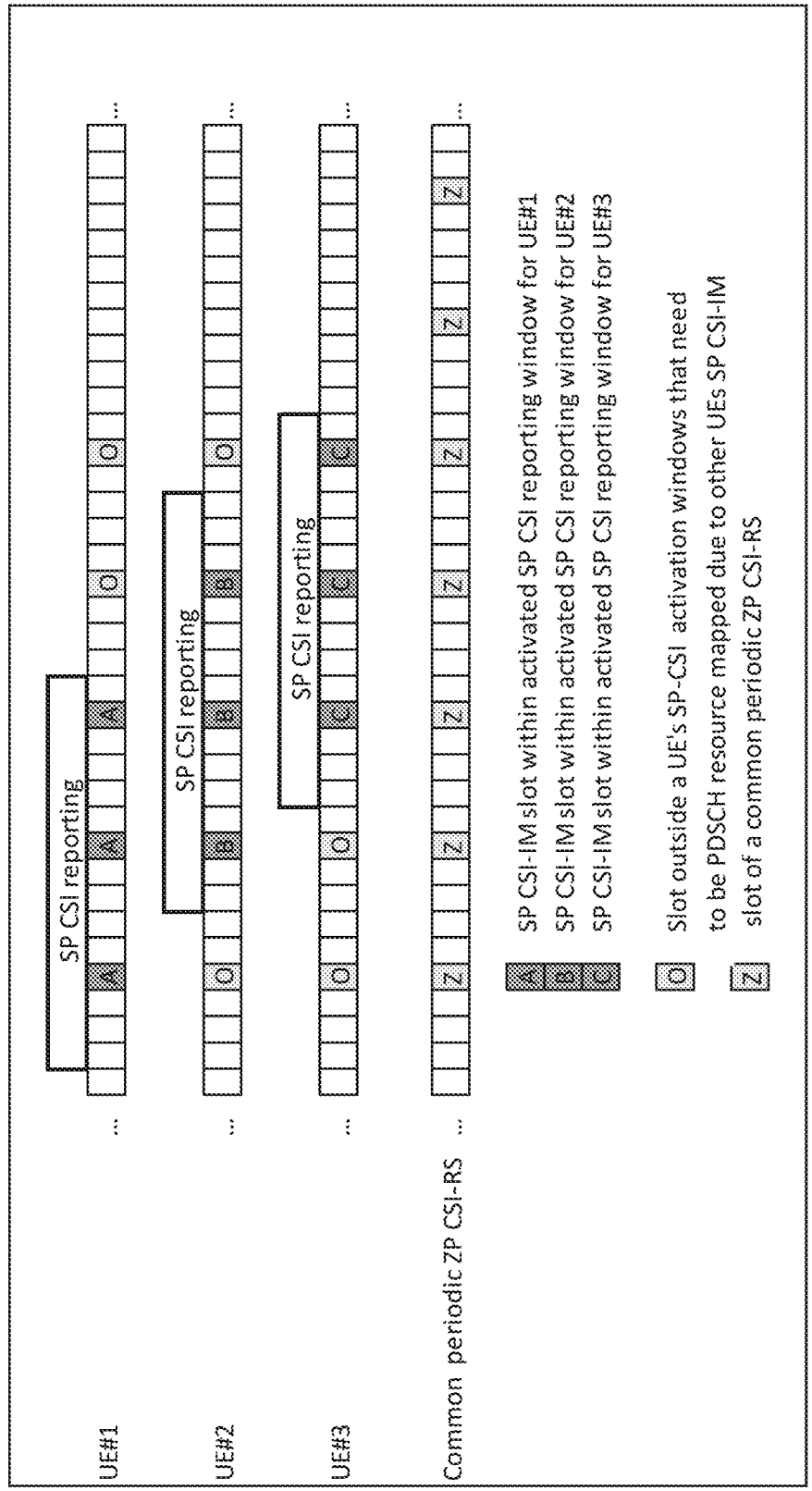
FIG. 9-11 illustrate several examples of multiple wireless devices operating together, according to some embodiments of the present disclosure.

Since the most typical use case of SP CSI-IM is for inter-cell interference measurement and the inter-cell interference sources for UEs in the same cell is the same, all UEs can share the same SP CSI-IM. Thus, in Embodiment 4, a SP CSI-IM resource is shared by all UEs in a cell, i.e., the same SP CSI-IM resource (i.e. periodicity, slot offset, time-frequency REs in a slot) is configured for all UEs in a cell. A UE may not start interference measurement on the SP CSI-IM until after an associated SP CSI report is activated. There are a few options that can be used for rate matching indication:

Option 1: The UE always rate matches around the SP CSI-IM for decoding a PDSCH in a slot with the same slot offset as the SP CSI-IM regardless of the activation of the SP CSI report. This can be achieved by configuring a common periodic ZP CSI-RS having the same resource configuration as the SP CSI-IM for all the UEs. An example is shown in FIG. 9, where three UEs are shown and each of the UEs is activated at a different time for SP CSI reporting. Each UE is configured with a periodic ZP CSI-RS having the same periodicity, slot offset, and time-frequency resource. In this case, there is no additional dynamic signaling needed for rate matching around SP CSI-IM. The cost is some additional overhead if there is no SP CSI-IM activated during some period. Since the SP CSI-IM is common to all UEs, the additional overhead should be small.

Figure 10:
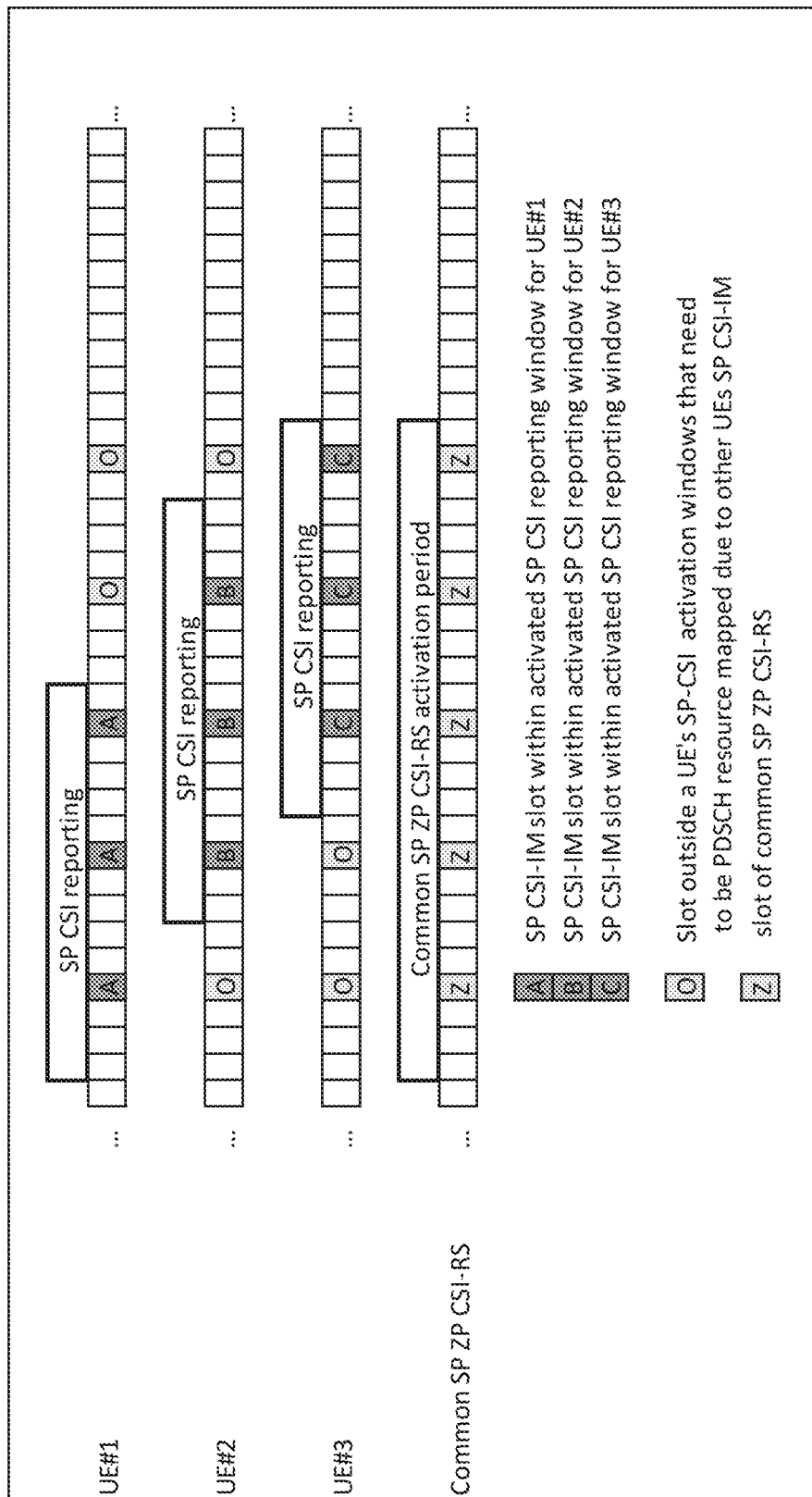

Option 2: A UE performs rate matching around SP CSI-IM for PDSCH only when a SP CSI report is activated by at least one UE. This can be achieved by configuring a common SP ZP CSI-RS having the same resource as the SP CSI-IM for all UEs. The SP ZP CSI-RS is enabled when at least one SP CSI report is activated and disabled when there is no SP CSI report activated. That is under the assumption, activating CSI activates the RSs. An example is shown in FIG. 10, where a common SP ZP CSI-RS is configured for all UEs. It is enabled when UE #1's SP CSI report is activated and disabled after UE #3's SP CSI report is deactivated. This needs to be signaled to each UE individually. In this example, when UE #1's SP CSI reporting is activated, gNB need also to send a command to all three UEs to enable the SP ZP CSI-RS. Similarly, when UE #3's SP CSI reporting is deactivated; gNB needs to send another command to all three UEs to disable the SP ZP CSI-RS. When the number of UEs is large, the signaling overhead can be large as well.

Figure 11:
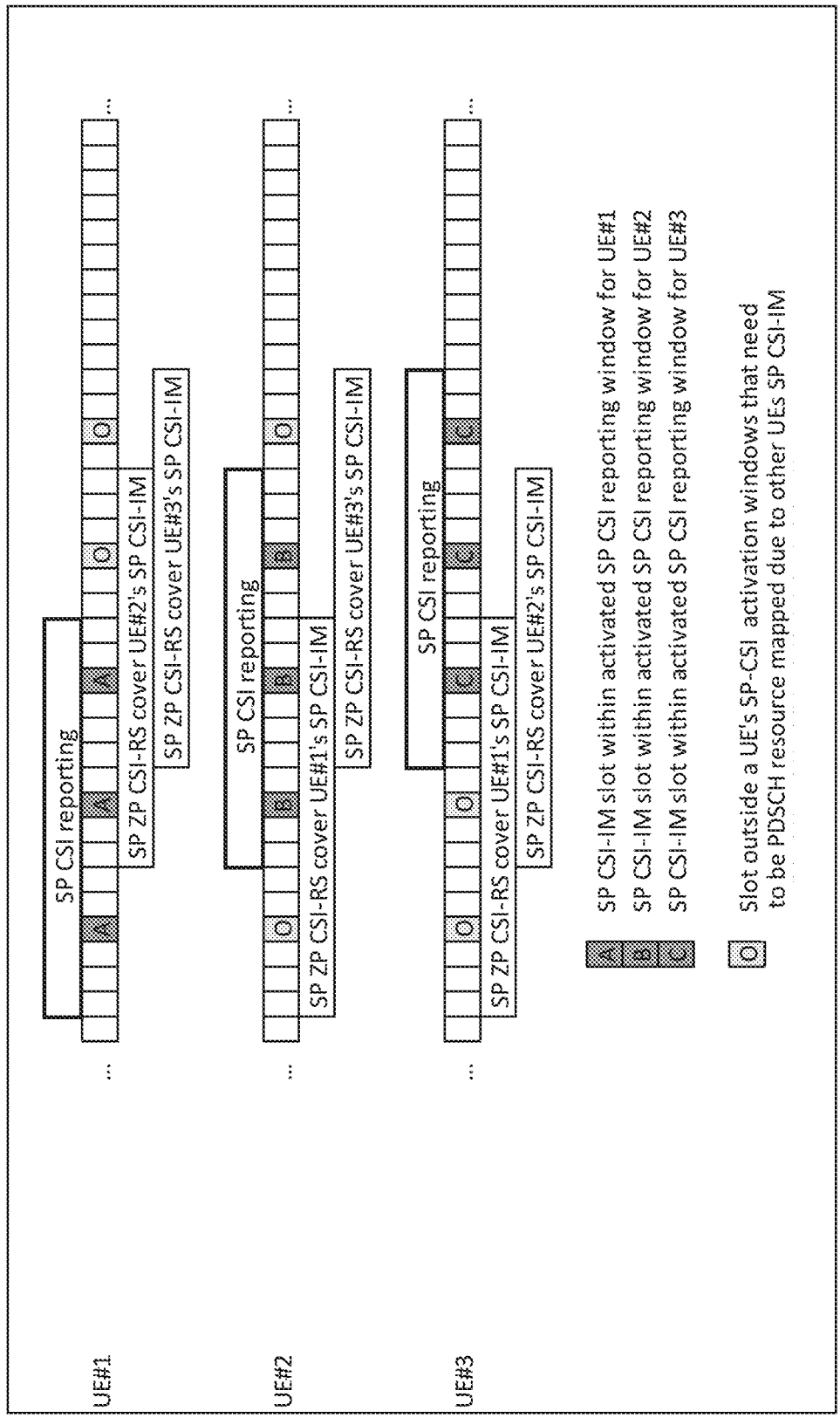

Option 3: a UE is configured with multiple SP ZP CSI-RS resources; each is mapped to a SP CSI-IM of one UE in the same cell. These SP ZP CSI-RS are enabled when the corresponding SP CSI reporting is activated and is disabled when the SP CSI reporting is deactivated. An example is shown in FIG. 11. In this case, when a SP CSI reporting is activated, the gNB needs to send a command to all UEs in the cell enable the corresponding SP ZP CSI-RS associated with the SP CSI-IM. Comparing to option 2, there are more signaling involved in the option. A potential advantage of this option is less resource overhead for rate matching when different SP CSI-IM resources are configured for different UEs since the SP ZP CSI-RS resource can be mapped exactly to each SP CSI-IM resource.

Figure 12:
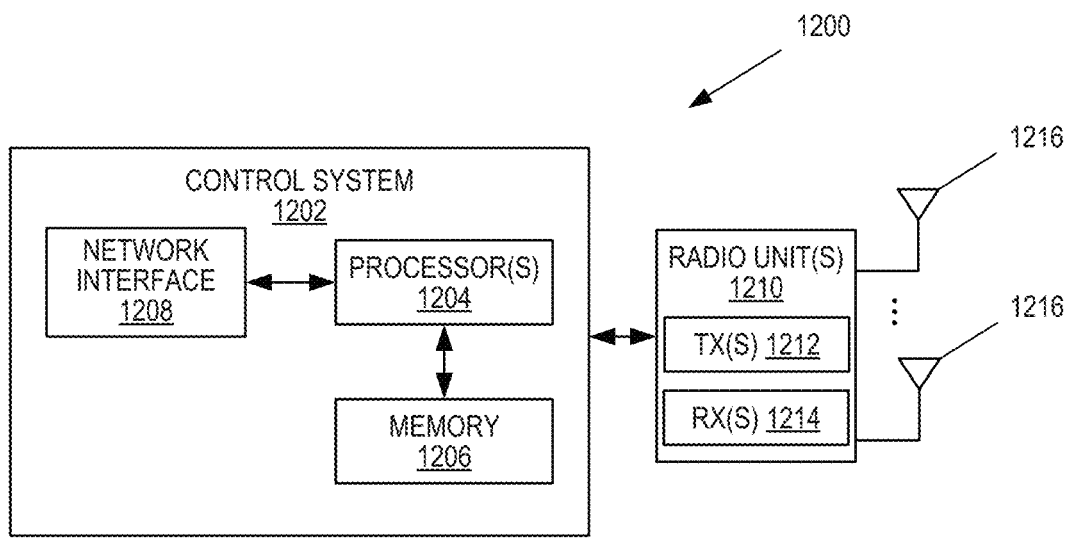
FIGS. 12-14 illustrate schematic block diagrams of a radio access node, according to some embodiments of the present disclosure.

FIG. 12 is a schematic block diagram of a radio access node 1200 according to some embodiments of the present disclosure. The radio access node 1200 may be, for example, a base station 502 or 506. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. In addition, the radio access node 1200 includes one or more radio units 1210 that each includes one or more transmitters 1212 and one or more receivers 1214 coupled to one or more antennas 1216. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
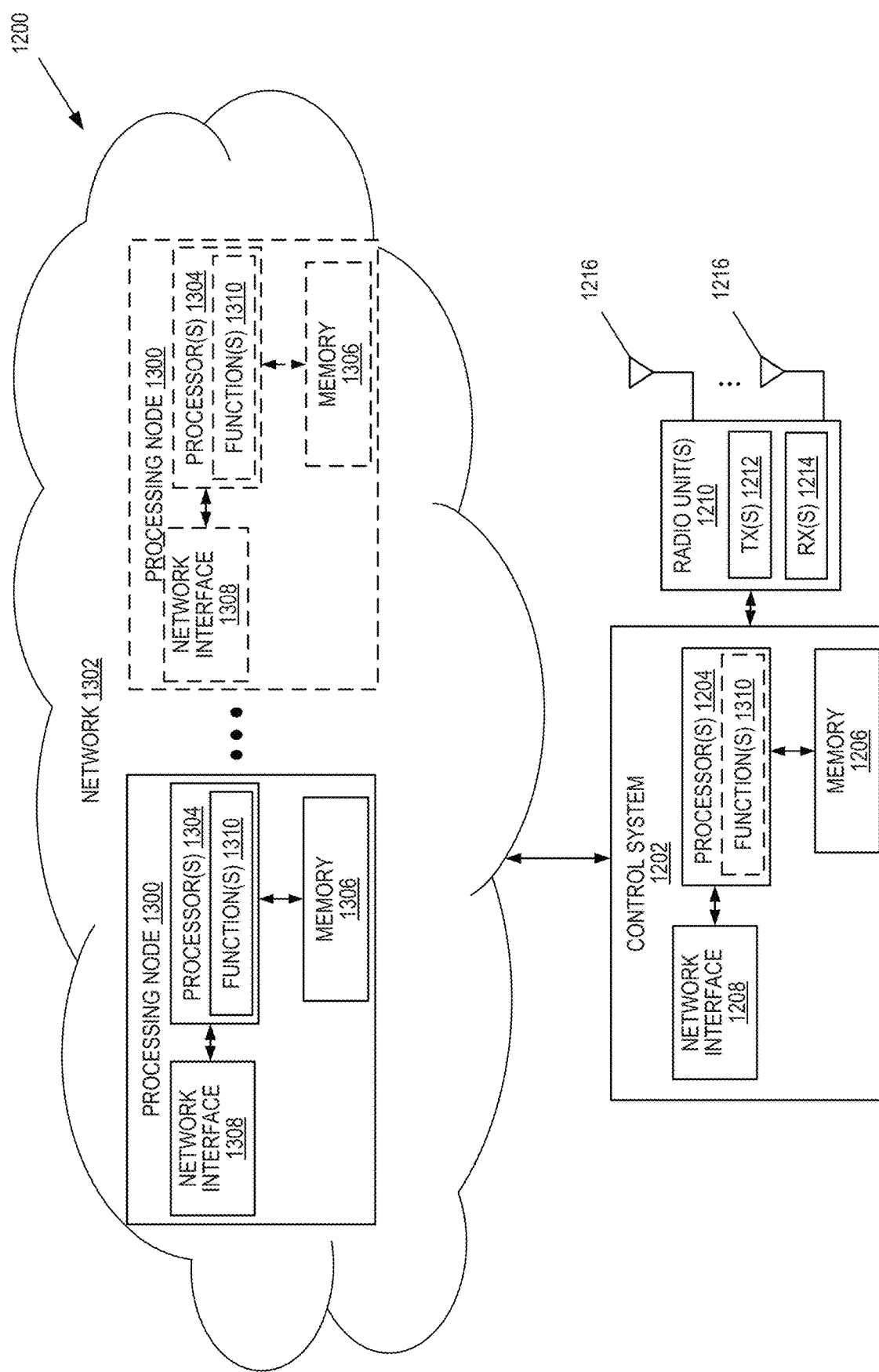

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicates directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
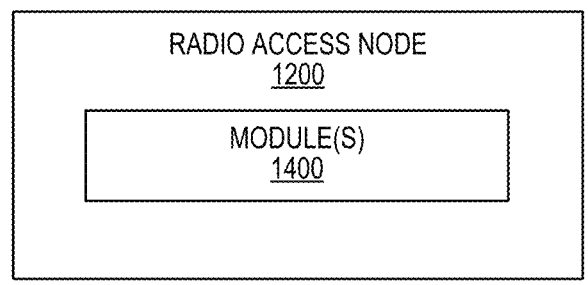

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
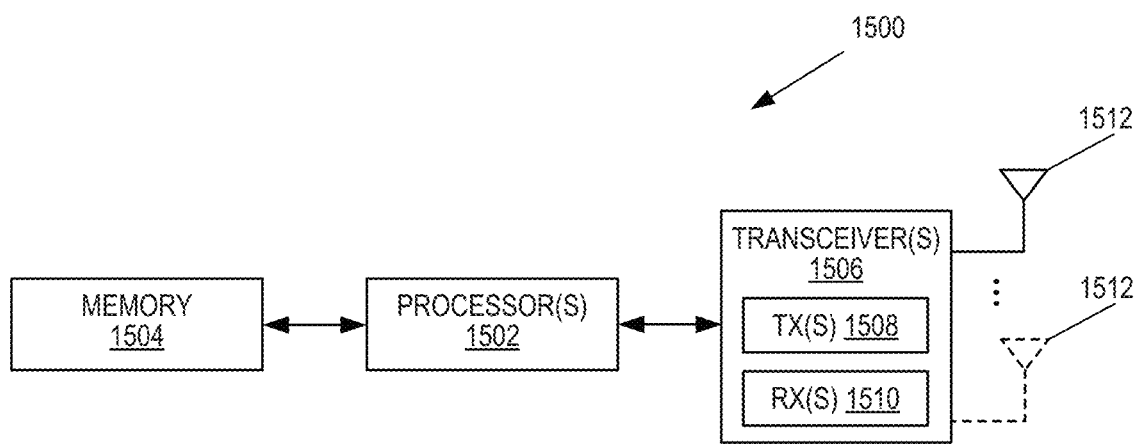
FIGS. 15 and 16 are schematic block diagrams of a wireless device, according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. In some embodiments, the functionality of the UE 1500 described above may be fully or partially implemented in software that is, e.g., stored in the memory 1504 and executed by the processor(s) 1502.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
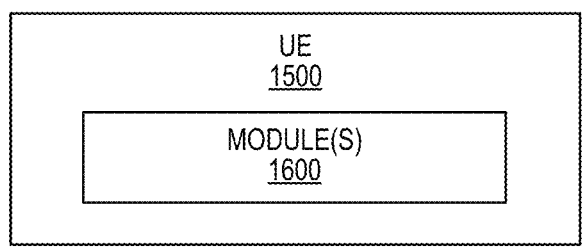

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
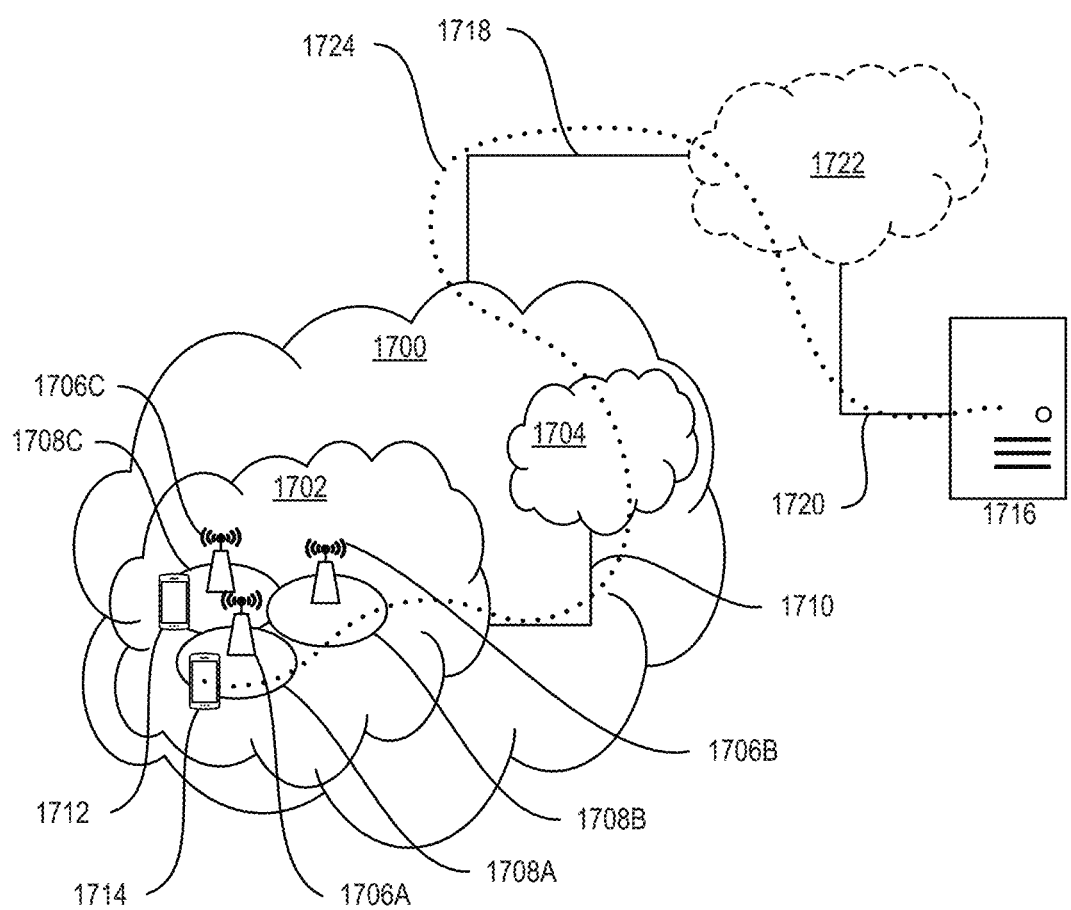
FIG. 17 illustrates a communication system including a telecommunication network, according to some embodiments of the present disclosure.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as NBs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
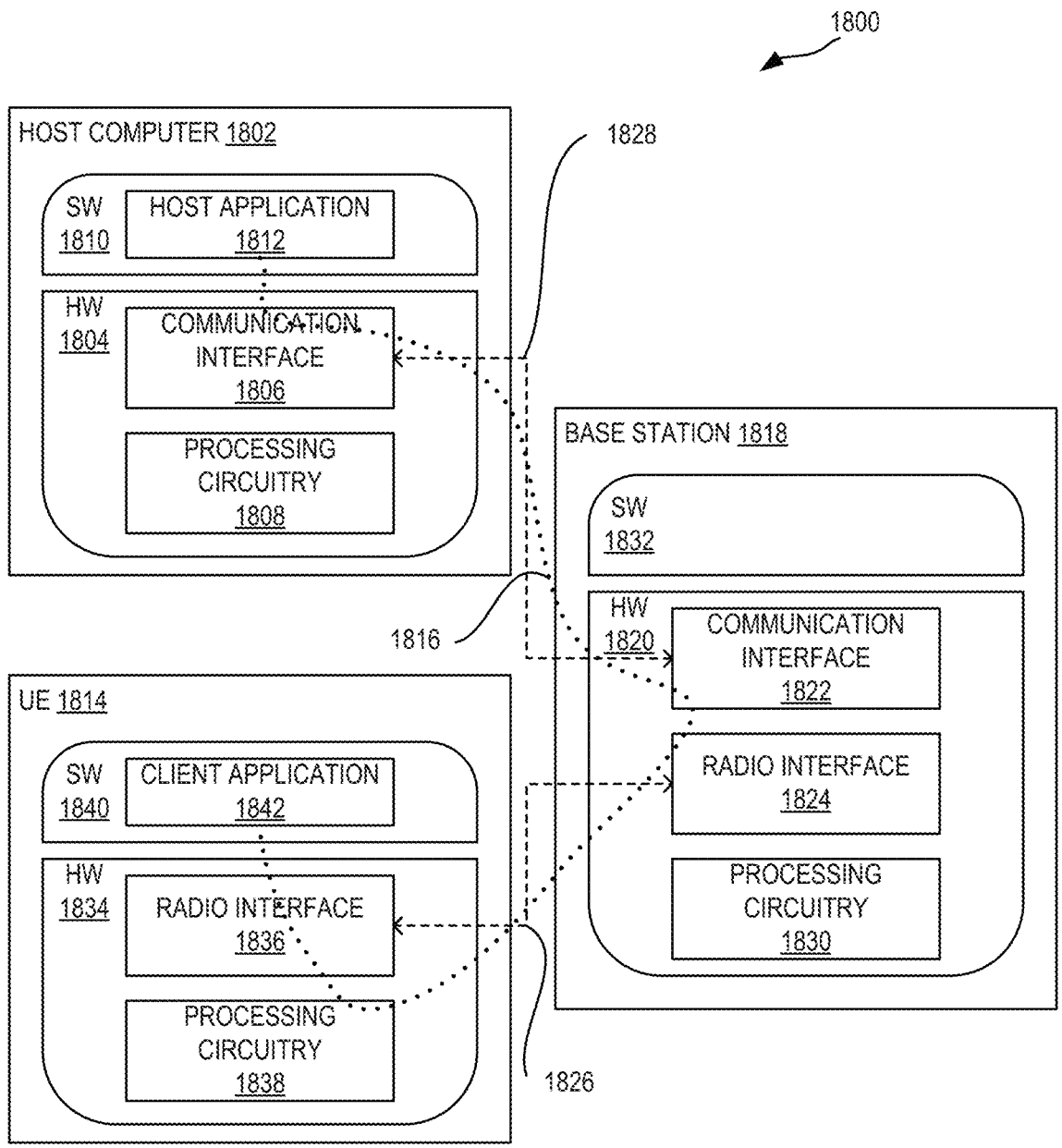
FIG. 18 illustrates a communication system, according to some embodiments of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve the downlink resource utilization efficiency and thereby provide benefits such as improved UE throughputs and network capacity.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1814, and it may be unknown or imperceptible to the base station 1814. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the invention, it should be understood that such order is exemplary (e.g., alternative embodiments may perform the operations in a different order, combine certain operations, overlap certain operations, etc.).

EMBODIMENTS

Group A Embodiments

1. A method performed by a wireless device (512) for activating a semi-persistent Physical Downlink Shared Channel, PDSCH, mapping rule, the method comprising at least one of:
  receiving (600), from a network node (502), a control message to activate a PDSCH mapping rule;
  determining (602), based on the control message, whether or not the PDSCH is mapped to resources of a Semi-Persistent, SP, Interference Measurement Resource, IMR.
2. The method of embodiment 1 where the control message is a Medium Access Control, MAC, Control Element, CE.
3. The method of embodiment 1 or 2 further comprising:
  using the control message to also activate at least one of a preconfigured SP Channel Measurement Resource, SP CMR, a preconfigured SP IMR, and a preconfigured SP Channel State Information, SP CSI, report.
4. The method of any of embodiments 1 to 3 wherein the activation of a PDSCH mapping rule comprises activation of a preconfigured SP Zero Power, ZP, CSI Reference Signal, CSI-RS, resource.
5. The method of embodiment 2, wherein the control message contains a first identifier that identifies at least one of the preconfigured SP CMR, the preconfigured SP IMR, and the preconfigured SP Zero Power, ZP, Channel State Information Reference Signal, CSI-RS, and, optionally, wherein the control message contains a second identifier that identifies the preconfigured SP CSI report.
6. The method of embodiment 5 wherein when the first identifier identifies at least both the preconfigured SP IMR and the preconfigured SP ZP CSI-RS, the wireless device (512) is instructed not to map PDSCH to the resources occupied by the preconfigured SP IMR.
7. The method of embodiment 5 wherein when the first identifier does not identify the preconfigured SP ZP CSI-RS but identifies at least the preconfigured SP IMR, the wireless device (512) is instructed to map PDSCH to the resources occupied by the preconfigured SP IMR.

8. The method of any of embodiments 5 through 7 wherein the first identifier is either a MeasLinkConfig or a ReportConfig parameter.
9. The method of any of embodiments 1 through 4 wherein activating the PDSCH mapping rule comprises receiving a control message containing an identifier bit which indicates to the wireless device (512) whether to map PDSCH to the resources occupied by the preconfigured SP IMR.
10. The method of embodiment 9 wherein the control message contains a first identifier that identifies at least one of the preconfigured SP CMR, the preconfigured SP IMR, and the preconfigured SP ZP CSI-RS, and wherein, optionally, the control message contains a second identifier that identifies the preconfigured SP CSI report; and, optionally,
  if the identifier bit is set to "1" or TRUE, then the PDSCH is not mapped to the resources of the SP CSI Interference Measurement (CSI-IM); and
  if the identifier bit is set to "0" or FALSE, then the PDSCH is mapped to the resources of the SP CSI-IM.
11. The method of embodiment 9 or 10 wherein the identifier bit is an R1 bit in the control message.
12. The method of any of embodiments 1 through 11 wherein the SP IMR is a SP CSI-IM.
13. The method of any of embodiments 2 through 12 wherein the SP CMR is a SP CSI-RS.
14. A method performed by a wireless device (512) for activating a Semi-Persistent, SP, Zero Power, ZP, Channel State Information Reference Signal, CSI-RS, the method comprising at least one of:
  receiving (700), from a network node (502), a control message that indicates the activation of one or more SP ZP CSI-RS resources; and
  activating (702), based on the control message, the one or more SP ZP CSI-RS resources.
15. The method of embodiment 14 where the control message is a Medium Access Control, MAC, Control Element, CE.
16. The method of embodiment 14 or 15 wherein the control message comprises a bitmap, wherein each bit in the bitmap indicates if one SP ZP CSI-RS resource is active or not.
17. The method of any of embodiments 14 through 16 wherein the control message comprises one or more identifier, where each identifier identifies a preconfigured SP ZP CSI-RS resource.
17a. The method of any of embodiments 14 through 17 wherein the one or more activated SP ZP CSI-RS resources are not used for PDSCH transmission.
18. A method performed by a wireless device (512) for activating a Semi-Persistent, SP, Zero Power, ZP, Channel State Information Reference Signal, CSI-RS, the method comprising:
  receiving (800), from a network node (502), a configuration for SP CSI Interference Measurement, CSI-IM, resources where all other wireless devices (512) in a cell comprising the wireless device (512) receive the same configuration; and
  determining (802) whether to rate match around the SP CSI-IM resources.
19. The method of embodiment 18 wherein determining whether to rate match around the SP CSI-IM resources comprises always determining to rate match around the SP CSI-IM resources.
20. The method of embodiment 18 wherein determining whether to rate match around the SP CSI-IM resources comprises determining to rate match around the SP CSI-IM resources if at least one of the other wireless devices (512) in the cell has an active SP CSI.

21. The method of embodiment 18 wherein determining whether to rate match around the SP CSI-IM resources comprises determining to rate match around the SP CSI-IM resources if at least one of the other wireless devices (512) in the cell has an active SP CSI at the same time as the SP CSI-IM resources to rate match around.

22. The method of any of the previous embodiments, further comprising:
   providing user data; and
   forwarding the user data to a host computer via the transmission to the base station.

Group B Embodiments

23. A method performed by a base station (502) for activating a semi-persistent Physical Downlink Shared Channel, PDSCH, mapping rule, the method comprising:
   transmitting (600), to a wireless device (512), a control message to activate a Semi-Persistent, SP, PDSCH mapping rule.

24. The method of embodiment 23 where the control message is a Medium Access Control, MAC, Control Element, CE.

25. The method of embodiment 23 or 24 further comprising:
   using the control message to also activate at least one of a preconfigured SP Channel Measurement Resource, SP CMR, a preconfigured SP Interference Measurement, IMR, and a preconfigured SP Channel State Information, SP CSI, report.

26. The method of any of embodiments 23 to 25 wherein the activation of a SP PDSCH mapping rule comprises activation of a preconfigured SP Zero Power, ZP, CSI-RS resource.

27. The method of embodiment 24, wherein the control message contains a first identifier that identifies at least one of a preconfigured SP Channel Measurement Resource, CMR, a preconfigured SP Interference Measurement, IMR, and a preconfigured SP Zero Power, ZP, Channel State Information Reference Signal, CSI-RS, and wherein, optionally, the control message contains a second identifier that identifies the preconfigured SP CSI report.

28. The method of embodiment 27 wherein when the first identifier identifies at least both the preconfigured SP IMR and the preconfigured SP ZP CSI-RS, the wireless device is instructed not to map PDSCH to the resources occupied by the preconfigured SP IMR.

29. The method of embodiment 27 wherein when the first identifier does not identify the preconfigured SP ZP CSI-RS but identifies at least the preconfigured SP IMR, the wireless device is instructed to map PDSCH to the resources occupied by the preconfigured SP IMR.

30. The method of any of embodiments 27 through 29 wherein the first identifier is either a MeasLinkConfig or a ReportConfig parameter.

31. The method of any of embodiments 23 through 26 wherein activating the PDSCH mapping rule comprises transmitting a control message containing an identifier bit which indicates to the wireless device whether to map PDSCH to the resources occupied by the preconfigured SP IMR.

32. The method of embodiment 31 wherein the control message contains a first identifier that identifies at least one of the preconfigured SP CMR, the preconfigured SP IMR, and the preconfigured SP ZP CSI-RS, and wherein, optionally, the control message contains a second identifier that identifies the preconfigured SP CSI report; and, optionally, if the identifier bit is set to "1" or TRUE, then the PDSCH is not mapped to the resources of the SP CSI Interference Measurement, CSI-IM; and
   if the identifier bit is set to "0" or FALSE, then the PDSCH is mapped to the resources of the SP CSI-IM.

33. The method of embodiment 31 or 32 wherein the identifier bit is an R1 bit in the control message.

34. The method of any of embodiments 23 through 33 wherein the SP IMR is a SP CSI-IM.

35. The method of any of embodiments 24 through 34 wherein the SP CMR is a SP CSI-RS.

36. A method performed by a base station (502) for activating a Semi-Persistent, SP, Zero Power, ZP, Channel State Information Reference Signal, CSI-RS, the method comprising:
   transmitting (700), to a wireless device (512), a control message that indicates the activation of one or more SP ZP CSI-RS resources.

37. The method of embodiment 36 where the control message is a Medium Access Control, MAC, Control Element, CE.

38. The method of embodiment 36 or 37 wherein the control message comprises a bitmap, wherein each bit in the bitmap indicates if one SP ZP CSI-RS resource is active or not.

39. The method of any of embodiments 36 through 38 wherein the control message comprises one or more identifiers, where each identifier identifies a preconfigured SP ZP CSI-RS resource.

40. A method performed by a base station (502) for activating a Semi-Persistent, SP, Zero Power, ZP, Channel State Information Reference Signal, CSI-RS, the method comprising:
   transmitting (800), to a wireless device (512), a configuration for SP CSI Interference Measurement, CSI-IM, resources where all other wireless devices (512) in a cell comprising the wireless device (512) receive the same configuration.

41. The method of any of the previous embodiments, further comprising:
   obtaining user data; and
   forwarding the user data to a host computer or a wireless device.

Group C Embodiments

42. A wireless device for activating a Semi-Persistent, SP, Physical Downlink Shared Channel, PDSCH, mapping rule, and/or for activating a SP Zero Power, ZP, Channel State Information Reference Signal, CSI-RS, the wireless device comprising:
   processing circuitry configured to perform any of the steps of any of the Group A embodiments; and
   power supply circuitry configured to supply power to the wireless device.

43. A base station for activating a Semi-Persistent, SP, Physical Downlink Shared Channel, PDSCH, mapping rule, and/or for activating a SP Zero Power, ZP, Channel State Information Reference Signal, CSI-RS, the base station comprising:
   processing circuitry configured to perform any of the steps of any of the Group B embodiments; and
   power supply circuitry configured to supply power to the wireless device.

44. A User Equipment, UE, for activating a Semi-Persistent, SP, Physical Downlink Shared Channel, PDSCH mapping rule, and/or for activating a SP Zero Power, ZP, Channel State Information Reference Signal, CSI-RS, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

45. A communication system including a host computer comprising:
   processing circuitry configured to provide user data; and
   a communication interface configured to forward the user data to a cellular network for transmission to a User Equipment, UE;
   wherein the cellular network comprises a base station having a radio interface and processing circuitry, the base station's processing circuitry configured to perform any of the steps of any of the Group B embodiments.

46. The communication system of the pervious embodiment further including the base station.

47. The communication system of the previous 2 embodiments, further including the UE, wherein the UE is configured to communicate with the base station.

48. The communication system of the previous 3 embodiments, wherein:
   the processing circuitry of the host computer is configured to execute a host application, thereby providing the user data; and
   the UE comprises processing circuitry configured to execute a client application associated with the host application.

49. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the base station performs any of the steps of any of the Group B embodiments.

50. The method of the previous embodiment, further comprising, at the base station, transmitting the user data.

51. The method of the previous 2 embodiments, wherein the user data is provided at the host computer by executing a host application, the method further comprising, at the UE, executing a client application associated with the host application.

52. A User Equipment, UE, configured to communicate with a base station, the UE comprising a radio interface and processing circuitry configured to perform the method of the previous 3 embodiments.

53. A communication system including a host computer comprising:
   processing circuitry configured to provide user data; and
   a communication interface configured to forward user data to a cellular network for transmission to a User Equipment, UE;
   wherein the UE comprises a radio interface and processing circuitry, the UE's components configured to perform any of the steps of any of the Group A embodiments.

54. The communication system of the previous embodiment, wherein the cellular network further includes a base station configured to communicate with the UE.

55. The communication system of the previous 2 embodiments, wherein:
   the processing circuitry of the host computer is configured to execute a host application, thereby providing the user data; and
   the UE's processing circuitry is configured to execute a client application associated with the host application.

56. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the UE performs any of the steps of any of the Group A embodiments.

57. The method of the previous embodiment, further comprising at the UE, receiving the user data from the base station.

58. A communication system including a host computer comprising:
   communication interface configured to receive user data originating from a transmission from a User Equipment, UE, to a base station;
   wherein the UE comprises a radio interface and processing circuitry, the UE's processing circuitry configured to perform any of the steps of any of the Group A embodiments.

59. The communication system of the previous embodiment, further including the UE.

60. The communication system of the previous 2 embodiments, further including the base station, wherein the base station comprises a radio interface configured to communicate with the UE and a communication interface configured to forward to the host computer the user data carried by a transmission from the UE to the base station.

61. The communication system of the previous 3 embodiments, wherein:
   the processing circuitry of the host computer is configured to execute a host application; and
   the UE's processing circuitry is configured to execute a client application associated with the host application, thereby providing the user data.

62. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

63. A method implemented in a communication system including a host computer, a base station, and a User Equipment, UE, the method comprising:
   at the host computer, receiving user data transmitted to the base station from the UE, wherein the UE performs any of the steps of any of the Group A embodiments.

64. The method of the previous embodiment, further comprising, at the UE, providing the user data to the base station.
65. The method of the previous 2 embodiments, further comprising:
   at the UE, executing a client application, thereby providing the user data to be transmitted; and
   at the host computer, executing a host application associated with the client application.
66. The method of the previous 3 embodiments, further comprising:
   at the UE, executing a client application; and
   at the UE, receiving input data to the client application, the input data being provided at the host computer by executing a host application associated with the client application;
   wherein the user data to be transmitted is provided by the client application in response to the input data.
67. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.
68. The communication system of the previous embodiment further including the base station.
69. The communication system of the previous 2 embodiments, further including the UE, wherein the UE is configured to communicate with the base station.
70. The communication system of the previous 3 embodiments, wherein:
   the processing circuitry of the host computer is configured to execute a host application; and
   the UE is configured to execute a client application associated with the host application, thereby providing the user data to be received by the host computer.
71. A method implemented in a communication system including a host computer, a base station, and a User Equipment, UE, the method comprising:
   at the host computer, receiving, from the base station, user data originating from a transmission which the base station has received from the UE, wherein the UE performs any of the steps of any of the Group A embodiments.
72. The method of the previous embodiment, further comprising at the base station, receiving the user data from the UE.
73. The method of the previous 2 embodiments, further comprising at the base station, initiating a transmission of the received user data to the host computer.

Group D Embodiments

D1. A Method of activating a Semi-Persistent, SP, Physical Downlink Shared Channel, PDSCH mapping rule in a wireless device, the method comprising at least one of:
   a. receiving a Medium Access Control, MAC, Control Element, CE from a network node to activate a SP PDSCH mapping rule; and
   b. using the MAC CE message to also activate at least one of a preconfigured SP Channel Measurement Resource, CMR, a preconfigured SP Interference Measurement Resource, IMR, and a preconfigured SP Channel State Information, CSI, report.

D2. The method of embodiment D1, where the activation of a SP PDSCH mapping rule comprises activation of a preconfigured SP Zero Power, ZP, CSI Reference Signal, CSI-RS, resource.
D3. The method of embodiment D2, wherein the MAC CE message contains a first identifier that identifies at least one of the preconfigured SP CMR, the preconfigured SP IMR, and the preconfigured SP ZP CSI-RS, and wherein the MAC CE contains a second identifier that identifies the preconfigured SP CSI report.
D4. The method of either one of embodiments D2 and D3 wherein when the first identifier identifies at least both the preconfigured SP IMR and the preconfigured SP ZP CSI-RS, the wireless device is instructed not to map PDSCH to the resources occupied by the preconfigured SP IMR.
D5. The method of either one of embodiments D2 and D3 wherein when the first identifier does not identify the preconfigured SP ZP CSI-RS but identifies at least the preconfigured SP IMR, the wireless device is instructed to map PDSCH to the resources occupied by the preconfigured SP IMR.
D6. The method of embodiments D1 where activating the PDSCH mapping rule comprises receiving a MAC CE message containing an identifier bit which indicates to the wireless devise whether to map PDSCH to the resources occupied by the preconfigured SP IMR.
D7. The method of D1, where the SP CMR is a SP CSI-RS.
D8. The method of D1, where the SP IMR is a SP CSI Interference Measurement, CSI-IM.
D9. A method of activating preconfigured Semi-Persistent, SP, Zero Power, ZP, Channel State Information Reference Signal, CSI-RS, in a wireless device, the method comprising receiving a Medium Access Control, MAC, Control Element, CE, message from a network node wherein the MAC CE message indicates the activation of one or more SP ZP CSI-RS resources.
D10. The method of D9, where the MAC CE message comprises a bitmap, wherein each bit in the bitmap indicates if one SP ZP CSI-RS resource is active or not.
D11. The method of either one of D9-D10, where the MAC CE message comprises one or more identifier, where each identifier identifies a preconfigured SP ZP CSI-RS resource.

At least some of the following abbreviations may be used in this disclosure. If there is an inconsistency between abbreviations, preference should be given to how it is used above. If listed multiple times below, the first listing should be preferred over any subsequent listing(s).
   3GPP Third Generation Partnership Project
   5G Fifth Generation
   AP CSI Aperiodic Channel State Information Reference Signal
   AP IMR Aperiodic Interference Measurement Resource
   ASIC Application Specific Integrated Circuit
   BWP Bandwidth Parts
   CC Component Carrier
   CE Control Element
   CMR Channel Management Resource
   CPU Central Processing Unit
   CQI Channel Quality Indicator
   CRI Channel State Information-Reference Signal Resource Indicator
   CRS Cell Specific Reference Signal
   CSI Channel State Information
   CSI-IM Channel State Information Interference Measurement
   CSI-RS Channel State Information Reference Signal
   DCI Downlink Channel Information DL Downlink
DMRS Demodulation Reference Signal
eNB Enhanced or Evolved Node B
FD-MIMO Full Dimension Multi-Input Multi-Output
FPGA Field Programmable Gate Array
gNB New Radio Base Station
IE Information Element
IMR Interference Measurement Resource
LCID Logical Channel Identifier
LTE Long Term Evolution
MAC Medium Access Control
MIMO Multiple Input Multiple Output
MME Mobility Management Entity
MTC Machine Type Communication
NR New Radio
NR-PSS New Radio Primary Synchronization Sequence
NR-SSS New Radio Secondary Synchronization Sequence
NZP Non-Zero Power
P CSI Periodic Channel State Information Reference Signal
P IMR Periodic Interference Measurement Resource
P/SP Periodic/Semi-Periodic
PBCH Physical Broadcast Channel
PDCCH Physical Downlink Control Channel
PDSCH Physical Downlink Shared Channel
P-GW Packet Data Network Gateway
PMI Precoding Matrix Indicator
PUCCH Physical Uplink Control Channel
PUSCH Physical Uplink Shared Channel
QCL Quasi Co-Location
RE Resource Element
RI Rank Indicator
RRC Radio Resource Control
RS Reference Signal
SCEF Service Capability Exposure Function
SP Semi Periodic
SP CSI Semi Periodic Channel State Information
SP IMR Semi Periodic Interference Measurement Resource
SS Synchronization Sequence
TRP Transmission Reception Point
Tx Transmission
UE User Equipment
ZP Zero Power Those skilled in the art will recognize improvements and modifications to the embodiments of the present disclosure. All such improvements and modifications are considered within the scope of the concepts disclosed herein.

What is claimed is:

1. A method performed by a wireless device for activating a Semi-Persistent (SP) Zero Power (ZP) Channel State Information Reference Signal (CSI-RS), the method comprising:
receiving, from a base station, a control message that indicates activation of one or more SP ZP CSI-RS resources;
receiving, from the base station, a second control message indicating Non-Zero Power (NZP) CSI-RS, CSI-Interference Measurement (CSI-IM), or CSI and the control message and the second control message are a Medium Access Control (MAC) Control Element (CE) where the control message is separate from the second control message; and
activating, based on the control message, the one or more SP ZP CSI-RS resources.

2. The method of claim 1 wherein the control message comprises a bitmap, where each bit in the bitmap indicates if one SP ZP CSI-RS resource set is active or not.

3. The method of claim 2 wherein the SP ZP CSI-RS resource set to which the bitmap refers is a Radio Resource Control (RRC) configured list of SP ZP CSI-RS resources.

4. The method of claim 1 wherein the control message comprises one or more identifiers, where each identifier identifies a preconfigured SP ZP CSI-RS resource set.

5. The method of claim 1 further comprising:
in response to activating the one or more SP ZP CSI-RS resources, Physical Downlink Shared Channel (PDSCH) resource mapping around the one or more SP ZP CSI-RS resources.

6. The method of claim 1 further comprising:
receiving, from the base station, a deactivation control message that indicates the deactivation of the one or more SP ZP CSI-RS resources where the deactivation control message is a MAC CE; and
deactivating, based on the deactivation control message, the one or more SP ZP CSI-RS resources.

7. The method of claim 6 further comprising:
in response to deactivating the one or more SP ZP CSI-RS resources, stopping Physical Downlink Shared Channel (PDSCH) resource mapping around resources for the one or more SP ZP CSI-RS.

8. A method performed by a base station for activating a Semi-Persistent (SP) Zero Power (ZP) Channel State Information Reference Signal (CSI-RS), the method comprising:
transmitting, to a wireless device, a control message that indicates activation of one or more SP ZP CSI-RS resources;
transmitting, to the wireless device, a second control message indicating Non-Zero Power (NZP) CSI-RS, CSI-Interference Measurement (CSI-IM), or CSI and the control message and the second control message are a Medium Access Control (MAC) Control Element (CE), where the control message is separate from the second control message.

9. The method of claim 8 wherein the control message comprises a bitmap, where each bit in the bitmap indicates if one SP ZP CSI-RS resource set is active or not.

10. The method of claim 9 wherein the one SP ZP CSI-RS resource set to which the bitmap refers is a Radio Resource Control (RRC) configured list of SP ZP CSI-RS resources.

11. The method of claim 8 wherein the control message comprises one or more identifiers, where each identifier identifies a preconfigured SP ZP CSI-RS resource set.

12. The method of claim 8 further comprising:
in response to activating the one or more SP ZP CSI-RS resources, the wireless device Physical Downlink Shared Channel (PDSCH) resource maps around the one or more SP ZP CSI-RS resources.

13. The method of claim 8 further comprising:
transmitting, to the wireless device, a deactivation control message that indicates the deactivation of the one or more SP ZP CSI-RS resources where the deactivation control message is a MAC CE.

14. The method of claim 8 further comprising:
in response to deactivating the one or more SP ZP CSI-RS resources, the wireless device stops Physical Downlink Shared Channel (PDSCH) resource mapping around resources for the one or more SP ZP CSI-RS.

15. A wireless device for activating a Semi-Persistent (SP) Zero Power (ZP) Channel State Information Reference Signal (CSI-RS), comprising:

one or more network interfaces;
one or more processors; and
memory comprising instructions executable by the one or more processors whereby the wireless device is operable to:
    receive, from a base station, a control message that indicates activation of one or more SP ZP CSI-RS resources;
    receive, from the base station, a second control message indicating Non-Zero Power (NZP) CSI-RS, CSI-Interference Measurement (CSI-IM), or CSI and the control message and the second control message are a Medium Access Control (MAC) Control Element (CE), where the control message is separate from the second control message; and
    activate, based on the control message, the one or more SP ZP CSI-RS resources.

16. The wireless device of claim 15 wherein the control message comprises a bitmap, where each bit in the bitmap indicates if one SP ZP CSI-RS resource set is active or not.

17. The wireless device of claim 16 wherein the one SP ZP CSI-RS resource set which the bitmap refers to is a Radio Resource Control (RRC) configured list of SP ZP CSI-RS resources.

18. The wireless device of claim 15 wherein the control message comprises one or more identifiers, where each identifier identifies a preconfigured SP ZP CSI-RS resource set.

19. The wireless device of claim 15 further operable to:
    in response to activating the one or more SP ZP CSI-RS resources, Physical Downlink Shared Channel (PDSCH) resource map around the one or more SP ZP CSI-RS resources.

* * * * *